US012457078B2

United States Patent
Tian et al.

(10) Patent No.: US 12,457,078 B2
(45) Date of Patent: Oct. 28, 2025

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Jiejiao Tian, Guangdong (CN); Zhihua Shi, Guangdong (CN); Wenhong Chen, Guangdong (CN); Yingpei Huang, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 435 days.

(21) Appl. No.: 18/147,120

(22) Filed: Dec. 28, 2022

(65) Prior Publication Data

US 2023/0246783 A1 Aug. 3, 2023

Related U.S. Application Data

(63) Continuation of application No. PCT/CN2020/128461, filed on Nov. 12, 2020.

(51) Int. Cl.
*H04L 5/00* (2006.01)
*H04W 72/0446* (2023.01)

(52) U.S. Cl.
CPC ....... *H04L 5/0051* (2013.01); *H04W 72/0446* (2013.01)

(58) Field of Classification Search
CPC ................. H04L 5/0051; H04W 72/0446
See application file for complete search history.

(56) References Cited

U.S. PATENT DOCUMENTS

2019/0190582 A1* 6/2019 Guo .................. H04L 1/0061
2019/0254061 A1* 8/2019 Manolakos .......... H04L 5/0051
(Continued)

FOREIGN PATENT DOCUMENTS

CN 103096346 5/2013
CN 103945541 7/2014
(Continued)

OTHER PUBLICATIONS

CNIPA, Notification to grant patent right for invention for CN Application No. 202310646472.3, Oct. 21, 2024.
(Continued)

*Primary Examiner* — Brenda H Pham
(74) *Attorney, Agent, or Firm* — Hodgson Russ LLP

(57) ABSTRACT

Wireless communication methods and devices are provided. The method includes the following. Receive triggering signaling, where the triggering signaling is used to trigger transmission of a target sounding reference signal (SRS) resource set by a terminal device, the target SRS resource set is configured with a first slot offset, and the first slot offset can be used to determine a slot position used for transmitting a target SRS resource in the SRS resource set. The first slot offset is defined as can be used to determine a slot position used for transmitting the target SRS resource in the SRS resource set, in other words, the first slot offset may not be used to determine the slot position used for transmitting the target SRS resource in the SRS resource set.

12 Claims, 9 Drawing Sheets

(56) References Cited

U.S. PATENT DOCUMENTS

| | | | |
|---|---|---|---|
| 2020/0280404 A1 | 9/2020 | Qin et al. | |
| 2020/0280465 A1 | 9/2020 | Kim et al. | |

FOREIGN PATENT DOCUMENTS

| | | |
|---|---|---|
| CN | 109565840 | 4/2019 |
| CN | 110034889 | 7/2019 |
| CN | 110324124 | 10/2019 |
| CN | 110460416 | 11/2019 |
| CN | 110650001 | 1/2020 |
| CN | 111245587 | 6/2020 |
| CN | 111713067 | 9/2020 |
| WO | 2019157681 | 8/2019 |
| WO | 2019213914 | 11/2019 |
| WO | 2020084362 | 4/2020 |

OTHER PUBLICATIONS

Catt, "On enhancements on SRS flexibility, coverage and capacity," 3GPP TSG RAN WG1 #103-e, R1-2007829, Oct. 2020.
Futurewei, "Enhancements on SRS flexibility, coverage and capacity," 3GPP TSG RAN WG1 #103-e, R1-2007544, Oct. 2020.
CNIPA, First Office Action for CN Application No. 202310646472.3, Aug. 12, 2024.
Catt, "Discussion on enhancements on SRS flexibility, coverage and capacity," 3GPP TSG RAN WG1 #102-e, R1-2005688, Aug. 2020.
WIPO, International Search Report and Written Opinion for International Application No. PCT/CN2020/128461, Aug. 3, 2021.
ZTE, "Enhancements on SRS flexibility, coverage and capacity," 3GPP TSG RAN WG1 Meeting #102-e, R1-2005459, Aug. 2020.
"3rd Generation Partnership Project; Technical Specification Group Radio Access Network; NR; Physical channels and modulation (Release 15)," 3GPP TS 38.211, Dec. 2019, v15.8.0.
"3rd Generation Partnership Project; Technical Specification Group Radio Access Network; NR; Physical layer procedures for data (Release 15)," 3GPP TS 38.214, Dec. 2019, v15.8.0.
"3rd Generation Partnership Project; Technical Specification Group Radio Access Network; NR; Multiplexing and channel coding (Release 15)," 3GPP TS 38.212, Dec. 2019, v15.8.0.
EPO, Extended European Search Report for EP Application No. 20961113.6, Dec. 8, 2023.

* cited by examiner

SRS RESOURCE SET X: SLOT OFFSET K =4
SRS RESOURCE Y1: SLOT OFFSET M1=5
SRS RESOURCE Y2: SLOT OFFSET M2=6
SRS RESOURCE Y3: SLOT OFFSET K=4
SRS RESOURCE Y4: SLOT OFFSET K=4

WIRELESS COMMUNICATION METHOD AND DEVICE

CROSS-REFERENCE TO RELATED APPLICATION(S)

This application is a continuation of International Application No. PCT/CN2020/128461, filed Nov. 12, 2020, the entire disclosure of which is incorporated herein by reference.

TECHNICAL FIELD

Implementations of this disclosure relate to the field of communication, and more particularly to wireless communication methods and devices.

BACKGROUND

In a new radio (NR) system, in order to support various possible deployment scenarios and various new service types in the future, system design is very flexible. For example, uplink (UL) and downlink (DL) resources can be indicated and adjusted by higher-layer signaling and physical-layer signaling. Therefore, a slot or some symbols in a slot may be used for transmission in different directions at different time points, for example, can be used for UL transmission at a time point and can be used for DL transmission at another time point.

However, for an aperiodic sounding reference signal (SRS), a slot offset thereof can be configured by higher-layer signaling. In other words, before other values are configured by radio resource control (RRC) signaling, a slot offset between triggering signaling and SRS transmission remains constant, and as a result, a relative position between a slot for reception of triggering signaling and a slot for SRS transmission is fixed, which adds restrictions and reduces system flexibility.

SUMMARY

In a first aspect, a wireless communication method is provided. The method includes the following. Receive triggering signaling, where the triggering signaling is used to trigger transmission of a target sounding reference signal (SRS) resource set by a terminal device, the target SRS resource set is configured with a first slot offset, and the first slot offset can be used to determine a slot position used for transmitting a target SRS resource in the SRS resource set.

In a second aspect, a network device is provided. The network device includes a transceiver, a processor, and a memory. The memory storing computer programs which, when executed by the processor, are operable with the processor to cause the transceiver to transmit triggering signaling, where the triggering signaling is used to trigger transmission of a target SRS resource set by a terminal device, the target SRS resource set is configured with a first slot offset, and the first slot offset can be used to determine a slot position used for transmitting a target SRS resource in the SRS resource set.

In a third aspect, a terminal device is provided. The terminal device includes a transceiver, a processor, and a memory. The memory storing computer programs which, when executed by the processor, are operable with the processor to cause the transceiver to receive triggering signaling, where the triggering signaling is used to trigger transmission of a target sounding reference signal (SRS) resource set by a terminal device, the target SRS resource set is configured with a first slot offset, and the first slot offset can be used to determine a slot position used for transmitting a target SRS resource in the SRS resource set.

DETAILED DESCRIPTION

The following will describe technical solutions of implementations of the disclosure with reference to the accompanying drawings in implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

Figure 1:
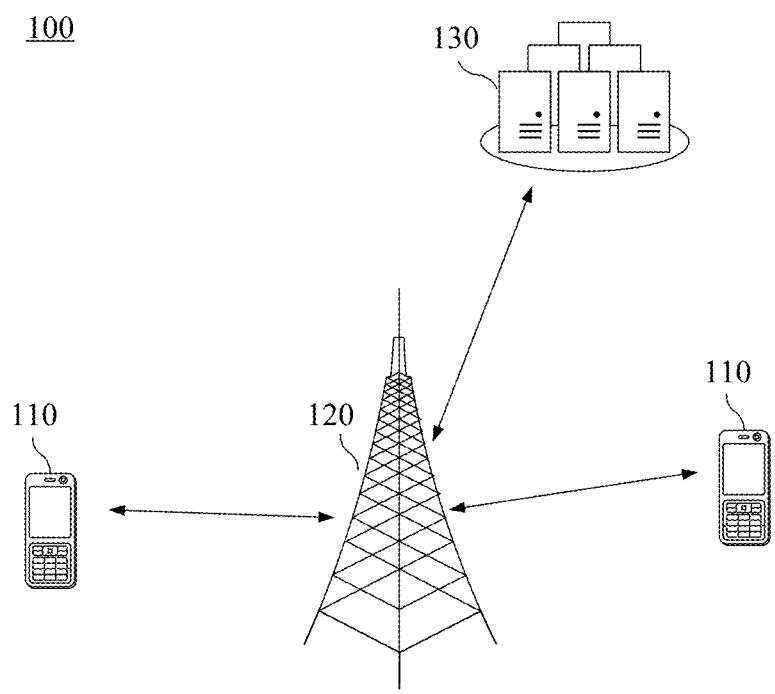
FIG. 1 illustrates an exemplary application scenario according to the disclosure.

FIG. 1 is a schematic diagram illustrating an application scenario according to implementations of the disclosure.

As illustrated in FIG. 1, a communication system 100 may include a terminal device 110 and a network device 120. The network device 120 can communicate with the terminal device 110 through an air interface. Multi-service transmission is supported between the terminal device 110 and the network device 120.

It should be understood that, the communication system 100 is merely taken as an example for illustration in implementations of the disclosure, but implementations of the disclosure are not limited thereto. In other words, technical solutions of implementations of the disclosure are applicable to various communication systems, for example, a long term evolution (LTE) system, an LTE time division duplex (TDD) system, a universal mobile telecommunication system (UMTS), a 5$^{th}$ generation (5G) communication system (also referred to as a new radio (NR) communication system, or a future communication system.

In the communication system 100 illustrated in FIG. 1, the network device 120 may be an access-network device that can communicate with the terminal device 110. The access-network device can provide a communication coverage for a specific geographical area and communicate with terminal devices 110 (such as user equipment (UE)) in the coverage area.

The network device 120 may be an evolutional Node B (eNB or eNodeB) in an LTE system, a next generation radio access network (NG RAN) device, a gNB in an NR system, or a radio controller in a cloud radio access network (CRAN). Or the network device 120 may be a relay station, an access point (AP), or an in-vehicle device, a wearable device, a hub, a switch, a bridge, a router, or a network device in a future evolved public land mobile network (PLMN).

The terminal device 110 may be any terminal device, and includes but is not limited to a terminal device that is in a wired or wireless connection with the network device 120 or other terminal devices.

For example, the terminal device 110 may refer to an access terminal, a UE, a subscriber unit, a subscriber station, a mobile station, a remote station, a remote terminal, a mobile device, a user terminal, a terminal, a wireless communication device, a user agent, or a user device, etc. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, or a terminal device in a future evolved network, etc.

Terminal devices 110 may communicate with each other through device to device (D2D) communication.

The wireless communication system 100 may further include a core-network device 130 that communicates with a base station. The core-network device 130 may be a 5G core (5GC) device, such as an access and mobility management function (AMF), an authentication server function (AUSF), a user plane function (UPF), or a session management function (SMF). Optionally, the core-network device 130 may also be an evolved packet core (EPC) device in an LTE network, such as an SMF+core packet gateway (SMF+PGW-C) device. It should be understood that, the SMF+PGW-C can implement functions of both an SMF and a PGW-C. In network evolution, the core-network device may also be called in other names, or other network entities may be formed through division of core-network functions, and implementations of the disclosure are not limited in this regard.

Various functional units in the communication system 100 may establish connections via an NG interface in order for communication.

For example, the terminal device establishes an air-interface connection with the access-network device via an NR interface, in order for transmission of user-plane data and control-plane signaling. The terminal device may establish a control-plane signaling connection with the AMF via NG interface 1 (referred to as "N1" for short). The access-network device, such as a gNB, may establish a user-plane data connection with the UPF via NG interface 3 (referred to as "N3" for short). The access-network device may establish a control-plane signaling connection with the AMF via NG interface 2 (referred to as "N2" for short). The UPF may establish a control-plane signaling connection with the SMF via NG interface 4 (referred to as "N4" for short). The UPF may exchange user-plane data with a data network via NG interface 6 (referred to as "N6" for short). The AMF may establish a control-plane signaling connection with the SMF via NG interface 11 (referred to as "N11" for short). The SMF may establish a control-plane signaling connection with a policy control function (PCF) via NG interface 7 (referred to as "N7" for short).

FIG. 1 exemplarily illustrates one base station, one core-network device, and two terminal devices. Optionally, the wireless communication system 100 may include multiple base stations, and there can be other quantities of terminal devices in a coverage area of each of the base stations. Implementations of the disclosure are not limited in this regard.

It should be understood that, in implementations of the disclosure, a device with communication functions in a network/system can be referred to as a "communication device". Taking the communication system 100 illustrated in FIG. 1 as an example, the communication device may include the network device 120 and the terminal device(s) 110 that have communication functions. The network device 120 and the terminal device(s) 110 can be the devices described above and will not be elaborated again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

Implementations of the disclosure provide a wireless communication method, which can be used for determining a slot for sounding reference signal (SRS) transmission.

For better understanding of implementations of the disclosure, the following will give an introduction to an SRS.

An SRS is an important reference signal in a $5^{th}$ generation (5G)/new radio (NR) system, and is widely used for various functions in an NR system. For example, the SRS can be used in the following scenarios.

1. Used for downlink (DL) channel state information (CSI) acquisition (user equipment (UE) sounding procedure for DL CSI acquisition).
2. Used for uplink (UL) beam management; used for frequency-domain scheduling and precoding determination in UL transmission.
3. Used for positioning functions.
4. Used for codebook-based UL transmission.

For example, the SRS is used for frequency-domain scheduling, and determination of rank indicator/precoding matrix indicator (PMI)/modulation coding scheme (MCS).

5. Used for non-codebook based UL transmission.

For example, the SRS is used for frequency-domain scheduling, and determination of SRS resource indicator (SRI)/MCS.

A network device can configure one or more SRS resource sets for a terminal device. Each SRS resource set can be configured with one or more SRS resources.

SRS transmission may be periodic, semi-persistent, or aperiodic.

A periodic SRS refers to an SRS that is periodically transmitted. A period and a slot offset for a periodic SRS are configured by radio resource control (RRC) signaling. Once receiving corresponding configuration parameters, the terminal device transmits SRS at a specific period until RRC configuration becomes invalid. Spatial relation information (Spatial Relation Info) for a periodic SRS is also configured by RRC signaling, where the spatial relation information can indicate a CSI-reference signal (RS), a synchronization signal/physical broadcast channel (PBCH) block (SSB), or a reference SRS. For example, a transmit beam for a periodic SRS may be implicitly indicated. For instance, the terminal device may determine the transmit beam for the periodic SRS according to the CSI-RS/SSB indicated. For another instance, the terminal device may determine, according to spatial relation information for an SRS resource, a transmit beam used for SRS transmission on the SRS resource.

A semi-persistent SRS is also an SRS that is periodically transmitted. A period and a slot offset for a semi-persistent SRS is configured by RRC signaling, but activation signaling and deactivation signaling for the semi-persistent SRS are carried in a media access control-control element (MAC CE). Once receiving the activation signaling, the terminal device transmits the SRS until the deactivation signaling is received. Spatial relation information (transmit beam) for the semi-persistent SRS is carried in the same MAC CE for activating the SRS.

After receiving a period and a slot offset configured by RRC, the terminal device can determine, according to the following formula, a slot that can be used for SRS transmission.

$$(N_{slot}^{frame,\mu} n_f + n_{s,f}^\mu - T_{offset}) \bmod T_{SRS} = 0$$

$T_{SRS}$ denotes the period configured, and $T_{offset}$ denotes the offset configured. $n_f$ denotes a radio-frame index, and $n_{s,f}^\mu$ denotes a slot index.

Aperiodic SRS transmission refers to SRS transmission by the terminal device that can be triggered by the network device via downlink control information (DCI). Triggering signaling used for triggering aperiodic SRS transmission may be carried in DCI for physical uplink shared channel (PUSCH)/physical downlink shared channel (PDSCH) scheduling in a UE-specific search space or common search space, or may be carried in DCI format 2_3 in a common search space.

In addition to triggering aperiodic SRS transmission, DCI format 2_3 can also be used to configure transmission power control (TPC) commands for SRSs for a group of UEs or a group of carriers.

TABLE 1

| | SRS triggering signaling |
|---|---|
| Value of SRS request field | Triggered aperiodic SRS resource set(s) for DCI format 0_1, 1_0, and 2_3 configured with higher layer parameter SRS-TPC-PDCCH-Group set to 'typeB' |
| 00 | No aperiodic SRS resource set triggered |
| 01 | SRS resource set(s) configured with higher layer parameter aperiodicSRS-ResourceTrigger set to 1 |
| 10 | SRS resource set(s) configured with higher layer parameter aperiodicSRS-ResourceTrigger set to 2 |
| 11 | SRS resource set(s) configured with higher layer parameter aperiodicSRS-ResourceTrigger set to 3 |

For example, if the value of the SRS request field in DCI is 11, SRS triggering signaling indicates to perform SRS transmission by using an SRS resource set configured with higher layer parameter aperiodicSRS-Resource Trigger set to 3.

Upon reception of triggering signaling (such as DCI) for an aperiodic SRS, the terminal device performs SRS transmission on an SRS resource set indicated by the triggering signaling. A slot offset between the triggering signaling and SRS transmission may be configured by higher-layer signaling (RRC). The network device indicates in advance to the terminal device configuration parameters for each SRS resource set via higher-layer signaling, where the configuration parameters include a time-frequency resource, a sequence parameter, a power control parameter, etc. In addition, for each SRS resource in the SRS resource set triggered, the terminal device can determine, according to spatial relation information for the resource, a transmit beam used for SRS transmission on the resource. The spatial relation information may be configured for each SRS resource by RRC.

Figure 2:
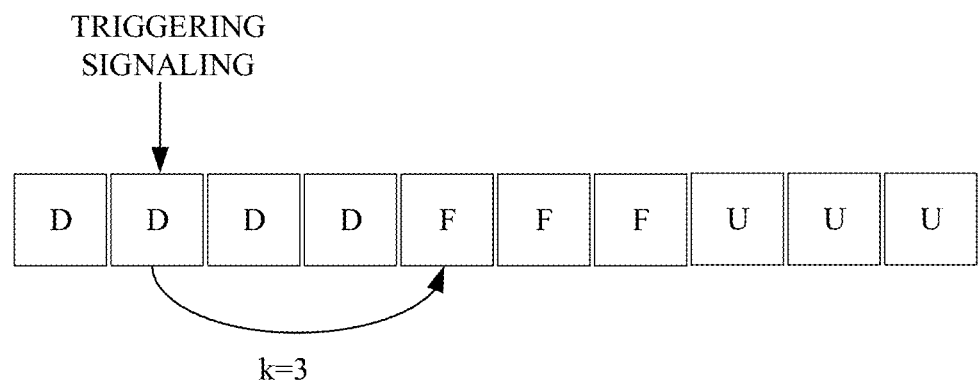
FIG. 2 and FIG. 3 are schematic timing diagrams illustrating sounding reference signal (SRS) transmission provided in implementations of the disclosure.

FIG. 2 is a schematic timing diagram illustrating SRS transmission provided in implementations of the disclosure.

As illustrated in FIG. 2, as to a slot offset, if DCI signaling for triggering an aperiodic SRS is received in slot n by a terminal device (i.e. UE), the UE will transmit, in slot n', an SRS resource in a corresponding SRS resource set. Optionally, n' can be obtained according to the following formula.

$$\left\lfloor n \cdot \frac{2^{\mu_{SRS}}}{2^{\mu_{PDCCH}}} \right\rfloor + k$$

k denotes RRC parameter slotOffset configured for each set. $\mu_{SRS}$ denotes a subcarrier-spacing configuration for a triggered SRS, and $\mu_{PDCCH}$ denotes a subcarrier-spacing configuration for a physical downlink control channel (PDCCH) carrying a triggering command.

In addition, in an NR system, by adding flexible configuration, it is possible to realize quicker and more flexible scheduling and various new service types in the future. For example, with aid of a slot format indicator (SFI), it is possible to realize symbol-level differentiation between an UL symbol and a DL symbol, thereby realizing quicker UL-DL symbol switching.

The following will elaborate an SFI.

A slot format includes a DL symbol, an UL symbol, and a flexible symbol. A format for each slot for the terminal device is configured by higher-layer parameter tdd-UL-DL-ConfigurationCommon. tdd-UL-DL-ConfigurationCommon includes a subcarrier-spacing configuration parameter (referenceSubcarrierSpacing) and a slot-format parameter (pattern1).

Optionally, pattern1 may include: a slot configuration period of P configured by higher-layer parameter dl-UL-TransmissionPeriodicity, the number of DL slots with only DL symbols configured by higher-layer parameter nrof-DownlinkSlots, the number of DL symbols configured by higher-layer parameter nrofDownlinkSymbols, the number of UL slots with only UL symbols configured by higher-layer parameter nrofUplinkSlots, and the number of UL symbols configured by higher-layer parameter nrofUplinkSymbols.

If the terminal device is configured with higher-layer parameter SFI, the terminal device can modify a slot format via DCI 2_0. A value of an SFI-index field in DCI 2_0 indicates to the terminal device a slot format for each slot in a number of slots for each DL bandwidth part (BWP) or each UL BWP, starting from a slot where DCI 2_0 is detected by the terminal device. The SFI-index field may include max $\{\lceil \log_2 (maxSFIindex+1) \rceil, 1\}$ bits, where a value of maxSFIindex may be the maximum value of values provided by higher-layer parameter slotFormatCombinationId.

As an example, the slot format can be determined according to format indexes provided in table 2.

TABLE 2

| Format index | | | | | | | | | | | | | | |
|---|---|---|---|---|---|---|---|---|---|---|---|---|---|---|
| Format index | Symbol in a slot | | | | | | | | | | | | | |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| ... | | | | | | | | | | | | | | |

As shown in table 2, "D" denotes a DL symbol, "U" denotes an UL symbol, and "F" denotes a flexible symbol.

It is to be noted that, the terminal cannot indicate, via the SFI-index field in DCI 2_0, a symbol configured as "UL" by tdd-UL-DL-ConfigurationCommon to be a DL symbol, and vice versa.

Since a slot offset for transmission of an aperiodic SRS is configured by higher-layer signaling (RRC signaling), a slot offset between triggering signaling and SRS transmission remains constant until other values are configured by RRC signaling, and as a result, a relative position between a slot for reception of triggering signaling and a slot for SRS transmission is fixed, which adds restrictions and reduces system flexibility.

For example, supposing that a slot offset is k, if SRS transmission in slot n+k needs to be triggered, corresponding triggering signaling can be transmitted only in slot n, in other words, an occasion for transmission of triggering signaling is restricted, which adds unnecessary restriction to scheduling of a network device.

For another example, supposing that a slot offset is k, if a slot or some symbols in a slot are dynamically changed to be used for DL transmission from UL transmission, it is likely that an aperiodic SRS cannot be transmitted. For instance, if slot n+k is changed to be used for DL transmission, SRS triggering signaling transmitted in slot n will be invalid, or triggering signaling cannot be transmitted in slot n.

Figure 3:
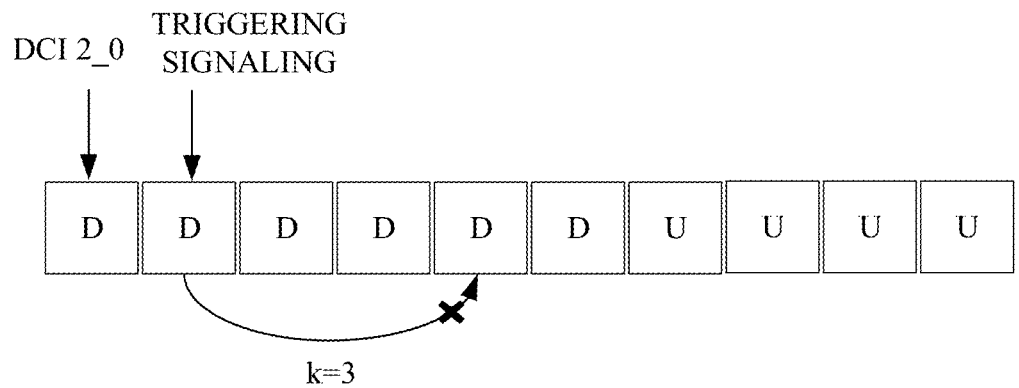

FIG. 3 is a schematic timing diagram illustrating SRS transmission when k=3 provided in implementations of the disclosure.

As illustrated in FIG. 3, a network device transmits DCI 2_0 signaling in $1^{st}$ slot and has already adjusted $5^{th}$ slot to a DL slot. The network device transmits triggering signaling in $2^{nd}$ slot to trigger transmission of an SRS with a slot offset of 3 by a terminal device, that is, to transmit an SRS in slot 5. However, since the slot format has been adjusted, that is, the $5^{th}$ Slot has been changed into a DL slot, the current SRS transmission will fail.

In some implementations of the disclosure, a slot offset for a resource set is defined as an offset for a valid slot, and a maximum range is introduced to restrict a slot position for SRS transmission, which can increase a probability of success in SRS transmission. In some other implementations of the disclosure, indication information is used to indicate an additional slot offset, and as such, a probability of success in SRS transmission can be increased. In some other implementations of the disclosure, a MAC CE is used to update a slot offset, and DCI is used to indicate an additional slot offset, which can increase a probability of success in SRS transmission. In some other implementations of the disclosure, an SFI is further restricted, and as such, a probability of success in SRS transmission can be increased.

It is to be noted that, for the convenience of illustration, a slot offset configured for an SRS resource set is referred to as a first slot offset, an SRS resource-level slot offset configured for an SRS resource is referred to as a second slot offset, and an additional slot offset indicated is referred to as a third slot offset.

Figure 4:
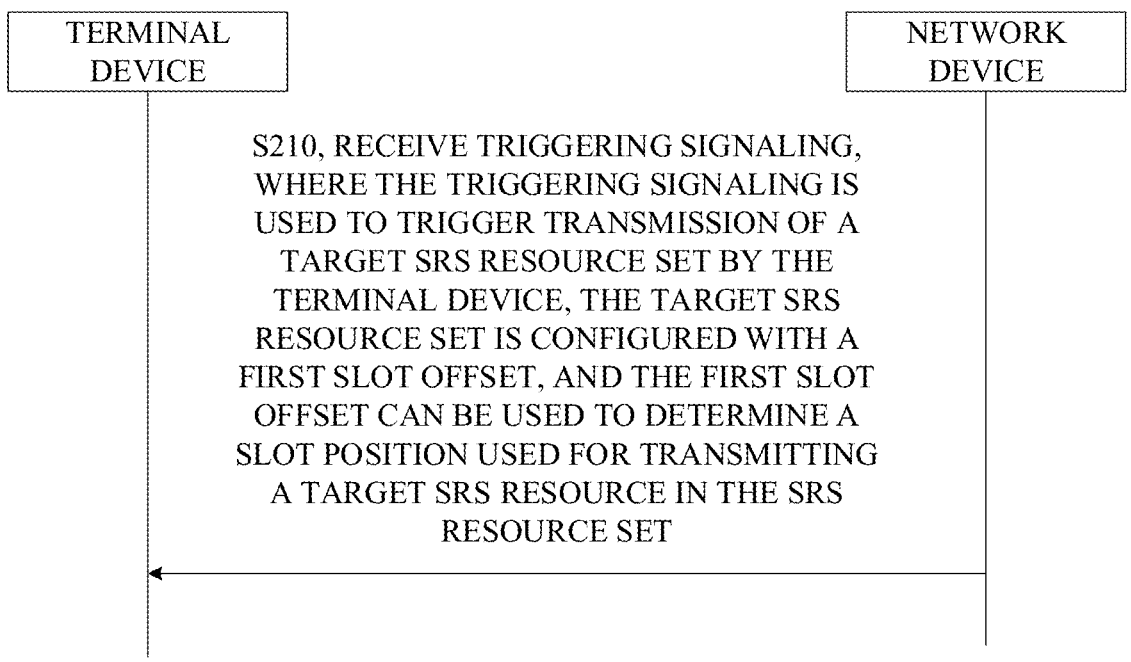
FIG. 4 is a schematic flowchart of a wireless communication method provided in implementations of the disclosure.

FIG. 4 is a schematic flowchart of a wireless communication method 200 according to implementations of the disclosure. The method 200 may be implemented interactively by a terminal device and a network device. A terminal device illustrated in FIG. 4 may be the terminal device illustrated in FIG. 1, and a network device illustrated in FIG. 4 may be the access-network device illustrated in FIG. 1.

As illustrated in FIG. 4, the method 200 may include the following.

S210, receive triggering signaling, where the triggering signaling is used to trigger transmission of a target SRS resource set by a terminal device, the target SRS resource set is configured with a first slot offset, and the first slot offset can be used to determine a slot position used for transmitting a target SRS resource in the target SRS resource set.

In other words, the first slot offset may be used to determine the slot position used for transmitting the target SRS resource in the SRS resource set, or may not be used to determine the slot position used for transmitting the target SRS resource in the SRS resource set.

By defining the first slot offset as can be used to determine the slot position used for transmitting the target SRS resource in the SRS resource set, in other words, the first slot offset may not be used to determine the slot position used for transmitting the target SRS resource in the SRS resource set, a slot offset between the triggering signaling and SRS transmission will not be fixed, that is, a relative position between a slot for reception of the triggering signaling and a slot for SRS transmission can be selected or determined, which is possible to reduce restrictions and improve system flexibility.

The first slot offset will be described in detail below.

In some implementations of the disclosure, at least one SRS resource set among one or more SRS resource sets can be configured with the first slot offset.

Optionally, the first slot offset is K, K represents a $K^{th}$ valid slot or a $(K+1)^{th}$ valid slot or represents a $K^{th}$ Slot or a $(K+1)^{th}$ slot, and K is an integer and K≥0.

Optionally, the first slot offset is configured by RRC signaling, a MAC CE, or DCI.

Optionally, a new field (slot_offset_R17) can be configured in SRS-ResourceSet signaling, where the new field is used to define K.

It is to be noted that, there is no limitation on the name and the position of the new field in implementations of the disclosure.

Optionally, the first slot offset is configured based on a value range T3~T4 of K, where T3 represents a minimum value of K, T4 represents a maximum value of K, and T3 and T4 are pre-set.

Optionally, K may be configured based on a format of "size (T3 . . . T4) OF".

Optionally, T4>T3, and T4≥K. T4 is a value specified in a protocol.

As an example, the value of K is selected from integers ranging from 1 to 16. Optionally, the value range includes 1 and 16.

As another example, the value of K is selected from integers ranging from 0 to 16. Optionally, the value range includes 0 and 16.

Compared with a design in which the value range is 1~32, a slot offset for an SRS resource set is defined to be at the $K^{th}$ valid slot, which can still satisfy configuration requirements while reducing properly the value range that can be configured.

Optionally, a network device can modify or update the first slot offset K via MAC CE signaling.

Optionally, the first slot offset is a valid slot for the target SRS resource set.

Optionally, the valid slot is a slot that can be used for transmission of all SRS resources in the target SRS resource set, and/or the valid slot is a slot that can be used for transmission of one or more SRS resources in the target SRS resource set, and/or the valid slot is a slot that can be used for transmission of symbol locations corresponding to all SRS resources in the target SRS resource set, and/or the valid slot is a slot that can be used for transmission of a symbol location corresponding to one or more SRS resources in the target SRS resource set, and/or the valid slot is a slot in which symbol locations corresponding to all SRS resources in the target SRS resource set can be used for UL transmission, and/or the valid slot is a slot in which a symbol location corresponding to one or more SRS resources in the target SRS resource set can be used for UL transmission.

It is to be noted that, regarding the first slot offset, elaborations of the valid slot in implementations of the disclosure are merely examples, and shall not be understood as limitation of the disclosure.

For example, in the disclosure, the slot that can be used for UL transmission may be understood as a slot used only for UL transmission (that is, always used for UL transmission), or may be understood as a slot including an UL symbol, or may be understood as a slot including a flexible symbol, or may be understood as a flexible slot, or may be understood as a slot that cannot be used for UL transmission occasionally (such as a slot that is used for DL transmission occasionally). Optionally, in the disclosure, whether the slot that can be used for UL transmission can actually be used for UL transmission depends on whether there is transmission collision with other signals.

The following will exemplify the case where symbols corresponding to the target SRS resource set are occupied by other UL signals.

For example, even if some symbols among the symbols corresponding to the target SRS resource set are occupied by other UL signals, a slot in which the target SRS resource set is located can still be regarded as the valid slot. For instance, according to rules specified in an NR protocol, if a transmission priority of a physical uplink control channel (PUCCH) is higher than that of an SRS, and the PUCCH and the SRS overlap in symbol, the SRS cannot be transmitted on some symbols among the symbols corresponding to the target SRS resource set, that is, the SRS can be transmitted on other symbols among the symbols corresponding to the target SRS resource set. In this case, the slot in which the target SRS resource set is located can still be regarded as the valid slot. In other words, a slot in which only some symbols can be used for transmitting SRS can still be regarded as the valid slot. As such, the SRS can be transmitted as early as possible, which is conducive to prompt SRS transmission and improves system performance.

For another example, even if all symbol locations in the symbols corresponding to the target SRS resource set are occupied by other UL signals, a slot in which the target SRS resource set is located can still be regarded as the valid slot. For instance, according to rules specified in an NR protocol, if a transmission priority of a PUCCH is higher than that of an SRS, and the PUCCH and the SRS overlap in symbol, none of the symbols corresponding to the target SRS resource set can be used for transmitting the SRS. In this case, the slot in which the target SRS resource set is located can still be regarded as the valid slot. As such, SRS transmission can be terminated promptly, which can avoid further delay, thereby reducing implementation complexity of the network device and the terminal device as well as providing an opportunity for the network device to transmit new triggering signaling.

In some implementations of the disclosure, the target SRS resource is not configured with a second slot offset, where the second slot offset is an SRS resource-level slot offset configured for some or all SRS resources in the target SRS resource set. The method 200 further includes transmitting, based on the first slot offset, the target SRS resource in the target SRS resource set.

In other words, if the target SRS resource is not configured with the second slot offset, the first slot offset is used to determine a slot position used for transmitting the target SRS resource in the target SRS resource set.

In some implementations of the disclosure, the target SRS resource is configured with a second slot offset, where the second slot offset is an SRS resource-level slot offset configured for some or all SRS resources in the target SRS resource set. The method 200 further includes transmitting, based on the second slot offset, the target SRS resource in the target SRS resource set.

In other words, if the target SRS resource is configured with the second slot offset, the first slot offset is not used to determine a slot position used for transmitting the target SRS resource in the target SRS resource set, and the second slot offset is used to determine a slot position used for transmitting the target SRS resource in the target SRS resource set.

The second slot offset will be described in detail below.

In some implementations of the disclosure, some or all SRS resources in the target SRS resource set are configured with the second slot offset of SRS resource level, where the second slot offset is M, M represents an $M^{th}$ valid slot or an $(M+1)^{th}$ valid slot or represents an $M^{th}$ slot or an $(M+1)^{th}$ slot, and M is an integer and M≥0.

Optionally, the second slot offset is configured by RRC signaling, a MAC CE, or DCI.

Optionally, a new field (slot_offset_R17) can be configured in SRS-Resource signaling, where the new field is used to define M.

It is to be noted that, there is no limitation on the name and the position of the new field in implementations of the disclosure.

Optionally, the second slot offset is configured based on a value range T1~T2 of M, where T1 represents a minimum value of M, T2 represents a maximum value of M, and T1 and T2 are pre-set.

Optionally, M may be configured based on a format of "size (T1 . . . T2) OF".

Optionally, T2>T1, and T2≥M. T2 is a value specified in a protocol.

Optionally, a value range of M is 0~16 or 1~16.

As an example, the value range of M is selected from integers ranging from 1 to 16. Optionally, the value range includes 1 and 16.

As another example, the value range of M is selected from integers ranging from 0 to 16. Optionally, the value range includes 0 and 16.

Compared with a design in which the value range is 1~32, a slot offset for an SRS resource is defined as the $M^{th}$ valid slot, which can still satisfy configuration requirements while reducing properly the value range that can be configured.

Optionally, the network device can modify or update the second slot offset M via MAC CE signaling.

Optionally, the second slot offset is a valid slot for the target SRS resource.

Optionally, the valid slot is a slot that can be used for transmission of the target SRS resource, and/or the valid slot is a slot that can be used for transmission of at least one symbol in the target SRS resource, and/or the valid slot is a slot in which a symbol location corresponding to the target SRS resource can be used for UL transmission, and/or the valid slot is a slot in which at least one symbol location among symbol locations corresponding to the target SRS resource can be used for UL transmission.

It is to be noted that, regarding the second slot offset, elaborations of the valid slot in implementations of the disclosure are merely examples, and shall not be understood as limitation of the disclosure.

For example, in the disclosure, the slot that can be used for UL transmission may be understood as a slot used only for UL transmission (that is, always used for UL transmission), or may be understood as a slot including an UL symbol, or may be understood as a slot including a flexible symbol, or may be understood as a flexible slot, or may be understood as a slot that cannot be used for UL transmission occasionally (such as a slot that is used for DL transmission occasionally). Optionally, in the disclosure, whether the slot that can be used for UL transmission can actually be used for UL transmission depends on whether there is transmission collision with other signals.

The following will exemplify the case where symbols corresponding to the target SRS resource are occupied by other UL signals, that is, the valid slot is a slot valid for the target SRS resource.

For example, even if some symbols among the symbols corresponding to the target SRS resource are occupied by other UL signals, a slot in which the target SRS resource is located can still be regarded as the valid slot. For instance, according to rules specified in an NR protocol, if a transmission priority of a PUCCH is higher than that of an SRS, and the PUCCH and the SRS overlap in symbol, the SRS cannot be transmitted on some symbols among the symbols corresponding to the target SRS resource, that is, the SRS can be transmitted on other symbols among the symbols corresponding to the target SRS resource. In this case, the slot in which the target SRS resource is located can still be regarded as the valid slot. In other words, a slot in which only some symbols can be used for transmitting the SRS can still be regarded as the valid slot. As such, the SRS can be transmitted as early as possible, which is conducive to prompt SRS transmission and improves system performance.

For another example, even if all symbol locations in the symbols corresponding to the target SRS resource are occupied by other UL signals, a slot in which the target SRS resource is located can still be regarded as the valid slot. For instance, according to rules specified in an NR protocol, if a transmission priority of a PUCCH is higher than that of an SRS, and the PUCCH and the SRS overlap in symbol, none of the symbols corresponding to the target SRS resource can be used for transmitting the SRS. In this case, the slot in which the target SRS resource is located can still be regarded as the valid slot. As such, SRS transmission can be terminated promptly, which can avoid further delay, thereby reducing implementation complexity of the network device and the terminal device as well as providing an opportunity for the network device to transmit new triggering signaling.

In some implementations of the disclosure, the method 200 further includes obtaining first indication information, where the first indication information indicates a third slot offset that is additionally configured for the target SRS resource set or an SRS resource in the target SRS resource set.

The third slot offset will be described in detail below.

In some implementations of the disclosure, the third slot offset can be additionally configured for the target SRS resource set or an SRS resource in the target SRS resource set.

Optionally, the third slot offset is N, N represents an $N^{th}$ slot or an $(N+1)^{th}$ slot or represents an $N^{th}$ valid slot or an $(N+1)^{th}$ valid slot, and N is an integer and N≥0.

Optionally, a value range of N is 0~16 or 1~16.

Compared with a design in which the value range is 1~32, the third slot offset can be defined as the $N^{th}$ valid slot, which can still satisfy configuration requirements while reducing properly the value range that can be configured.

Optionally, the first indication information is carried in DCI.

Optionally, the first indication information indicates the third slot offset by at least one bit.

Optionally, the amount of the at least one bit is pre-set or configured by a higher-layer parameter.

Optionally, the third slot offset N additionally configured is indicated by DCI signaling of X bits.

As an example, X=1, that is, the third slot offset N additionally configured is indicated by DCI signaling of 1 bit. Specifically, "0" indicates that no slot offset is added in order for signaling fallback and support of backward compatibility, and "1" indicates that one slot offset is added for each SRS resource in the SRS resource set, or vice versa. Or the third slot offset N is pre-set, for example, specified in a protocol.

As another example, X=2, that is, the slot offset additionally configured can be indicated by DCI signaling of 2 bits. Specifically, "00" indicates that no slot offset is added, "01" indicates that one slot offset is added for each SRS resource in the SRS resource set, "10" indicates that two slot offsets are added for each SRS resource in the SRS resource set, and "11" indicates that three slot offsets are added for each SRS resource in the SRS resource set, or vice versa. Or the slot offset value indicated may be pre-set, for example, specified in a protocol.

Optionally, X is pre-set.

It is to be noted that, in implementations of the disclosure, the "pre-set" can be implemented by pre-saving a corresponding code or table in a device (for example, including the terminal device and the network device) or in other manners that can be used for indicating related information, and the disclosure is not limited in this regard. For example, the "pre-set" may mean defined in a protocol. Optionally, the "protocol" may refer to a communication standard protocol, which may include, for example, an LTE protocol, an NR protocol, and a protocol applied to a future communication system, and the disclosure is not limited in this regard.

Optionally, the value of X is configured, for example, configured by a higher-layer parameter or configured by the network device.

Optionally, the third slot offset is a slot valid for the target SRS resource.

Optionally, the valid slot is a slot that can be used for transmission of the target SRS resource, and/or the valid slot is a slot that can be used for transmission of at least one symbol in the target SRS resource, and/or the valid slot is a slot in which a symbol location corresponding to the target SRS resource can be used for UL transmission, and/or the valid slot is a slot in which at least one symbol location among symbol locations corresponding to the target SRS resource can be used for UL transmission.

Optionally, the third slot offset is a slot valid for the target SRS resource set.

Optionally, the valid slot is a slot that can be used for transmission of all SRS resources in the target SRS resource set, and/or the valid slot is a slot that can be used for transmission of one or more SRS resources in the target SRS resource set, and/or the valid slot is a slot that can be used for transmission of symbol locations corresponding to all SRS resources in the target SRS resource set, and/or the valid slot is a slot that can be used for transmission of a symbol location corresponding to one or more SRS resources in the target SRS resource set, and/or the valid slot is a slot in which symbol locations corresponding to all SRS resources in the target SRS resource set can be used for UL transmission, and/or the valid slot is a slot in which a symbol location corresponding to one or more SRS resources in the target SRS resource set can be used for UL transmission.

It is to be noted that, regarding the third slot offset, elaborations of the valid slot in implementations of the disclosure are merely examples, and shall not be understood as limitation of the disclosure.

For example, in the disclosure, the slot that can be used for UL transmission may be understood as a slot used only for UL transmission (that is, always used for UL transmission), or may be understood as a slot including an UL symbol, or may be understood as a slot including a flexible symbol, or may be understood as a flexible slot, or may be understood as a slot that cannot be used for UL transmission occasionally (such as a slot that is used for DL transmission occasionally). Optionally, in the disclosure, whether the slot that can be used for UL transmission can actually be used for UL transmission depends on whether there is transmission collision with other signals.

The following will exemplify the case where symbols corresponding to the target SRS resource set are occupied by other UL signals, that is, the valid slot is a slot valid for the target SRS resource set.

For example, even if some symbols among the symbols corresponding to the target SRS resource set are occupied by other UL signals, a slot in which the target SRS resource set is located can still be regarded as the valid slot. For instance, according to rules specified in an NR protocol, if a transmission priority of a PUCCH is higher than that of an SRS, and the PUCCH and the SRS overlap in symbol, the SRS cannot be transmitted on some symbols among the symbols corresponding to the target SRS resource set, that is, SRS can be transmitted on other symbols among the symbols corresponding to the target SRS resource set. In this case, the slot in which the target SRS resource set is located can still be regarded as the valid slot. In other words, a slot in which only some symbols can be used for transmitting SRS can still be regarded as the valid slot. As such, the SRS can be transmitted as early as possible, which is conducive to prompt SRS transmission and improves system performance.

For another example, even if all symbol locations in the symbols corresponding to the target SRS resource set are occupied by other UL signals, a slot in which the target SRS resource set is located can still be regarded as the valid slot. For instance, according to rules specified in an NR protocol, if a transmission priority of a PUCCH is higher than that of an SRS, and the PUCCH and the SRS overlap in symbol, none of the symbols corresponding to the target SRS resource set can be used for transmitting the SRS. In this case, the slot in which the target SRS resource set is located can still be regarded as the valid slot. As such, SRS transmission can be terminated promptly, which can avoid further delay, thereby reducing implementation complexity of the network device and the terminal device as well as providing an opportunity for the network device to transmit new triggering signaling.

The following will exemplify the case where symbols corresponding to the target SRS resource are occupied by other UL signals, that is, the valid slot is a slot valid for the target SRS resource.

For example, even if some symbols among the symbols corresponding to the target SRS resource are occupied by other UL signals, a slot in which the target SRS resource is located can still be regarded as the valid slot. For instance, according to rules specified in an NR protocol, if a transmission priority of a PUCCH is higher than that of an SRS, and the PUCCH and the SRS overlap in symbol, the SRS cannot be transmitted on some symbols among the symbols corresponding to the target SRS resource, that is, the SRS can be transmitted on other symbols among the symbols corresponding to the target SRS resource. In this case, the slot in which the target SRS resource is located can still be regarded as the valid slot. In other words, a slot in which only some symbols can be used for transmitting the SRS can still be regarded as the valid slot. As such, the SRS can be transmitted as early as possible, which is conducive to prompt SRS transmission and improves system performance.

For another example, even if all symbol locations in the symbols corresponding to the target SRS resource are occupied by other UL signals, a slot in which the target SRS resource is located can still be regarded as the valid slot. For instance, according to rules specified in an NR protocol, if a transmission priority of a PUCCH is higher than that of an SRS, and the PUCCH and the SRS overlap in symbol, none of the symbols corresponding to the target SRS resource can be used for transmitting the SRS. In this case, the slot in which the target SRS resource is located can still be regarded as the valid slot. As such, SRS transmission can be terminated promptly, which can avoid further delay, thereby reducing implementation complexity of the network device and the terminal device as well as providing an opportunity for the network device to transmit new triggering signaling.

The following will elaborate SRS transmission based on the third slot offset.

In some implementations of the disclosure, the target SRS resource is not configured with the second slot offset, the second slot offset is an SRS resource-level slot offset configured for some or all SRS resources in the target SRS resource set, and the first indication information indicates the third slot offset that is additionally configured for an SRS resource not configured with the second slot offset in the target SRS resource set. The method 200 further includes transmitting the target SRS resource based on the first slot offset and the third slot offset.

In other words, if the target SRS resource is not configured with the second slot offset, and the first indication information is intended for an SRS resource not configured with the second slot offset, the first slot offset and the third slot offset are used to determine a slot position used for transmitting the target SRS resource in the SRS resource set.

Accordingly, if the target SRS resource is configured with the second slot offset, and the first indication information is intended for an SRS resource not configured with the second slot offset, the second slot offset is used to determine the slot position used for transmitting the target SRS resource in the SRS resource set.

In some implementations of the disclosure, the target SRS resource is configured with the second slot offset, the second slot offset is an SRS resource-level slot offset configured for some or all SRS resources in the target SRS resource set, and the first indication information indicates the third slot offset that is additionally configured for an SRS resource configured with the second slot offset in the target SRS resource set. The method 200 further includes transmitting the target SRS resource based on the second slot offset and the third slot offset.

In other words, if the target SRS resource is configured with the second slot offset, and the first indication information is intended for an SRS resource configured with the second slot offset, the first slot offset is not used to determine a slot position used for transmitting the target SRS resource in the SRS resource set, and the second slot offset and the third slot offset are used to determine the slot position used for transmitting the target SRS resource in the SRS resource set.

Accordingly, if the target SRS resource is not configured with the second slot offset, and the first indication information is intended for an SRS resource configured with the second slot offset, the first slot offset is used to determine the slot position used for transmitting the target SRS resource in the SRS resource set.

In some implementations of the disclosure, the first indication information indicates the third slot offset that is additionally configured for all SRS resources in the target SRS resource set or additionally configured for the target SRS resource set.

In some implementations of the disclosure, the target SRS resource is not configured with the second slot offset, and the second slot offset is an SRS resource-level slot offset configured for some or all SRS resources in the target SRS resource set. The method 200 further includes transmitting the target SRS resource based on the first slot offset and the third slot offset.

In other words, if the target SRS resource is not configured with the second slot offset, and the first indication information is intended for all the SRS resources in the target SRS resource set or the target SRS resource set, the first slot offset and the third slot offset are used to determine a slot position used for transmitting the target SRS resource in the SRS resource set.

In some implementations of the disclosure, the target SRS resource is configured with the second slot offset, and the second slot offset is an SRS resource-level slot offset configured for some or all SRS resources in the target SRS resource set. The method 200 further includes transmitting the target SRS resource based on the second slot offset and the third slot offset.

In other words, if the target SRS resource is configured with the second slot offset, and the first indication information is intended for an SRS resource configured with the second slot offset, the second slot offset and the third slot offset are used to determine a slot position used for transmitting the target SRS resource in the SRS resource set.

In some implementations of the disclosure, the first slot offset is K, and K is an integer and K≥0. Or some or all SRS resources in the target SRS resource set are configured with the second slot offset of SRS resource level, the second slot offset is M, and M is an integer and M≥0. Or the target SRS resource set or an SRS resource in the target SRS resource set is additionally configured with the third slot offset, the third slot offset is N, and N is an integer and N≥0. A slot used for transmission of the target SRS resource is a second slot. When K represents a $K^{th}$ valid slot or a $(K+1)^{th}$ valid slot, or M represents an $M^{th}$ valid slot or an $(M+1)^{th}$ valid slot, or N represents an $N^{th}$ Slot or an $(N+1)^{th}$ slot, the second slot belongs to G slots after a first slot in which the triggering signaling is located, where G is an integer and G≥0.

In other words, the G slots constitute a maximum range, to restrict a slot position used for SRS transmission, which is possible to reduce implementation complexity of the network device and the terminal device. In some cases, transmission corresponding to the current triggering signaling can be terminated promptly, which is conducive to transmission of new triggering signaling.

Optionally, the G slots are G UL slots.

Optionally, G is pre-defined or configured by a higher-layer parameter.

It is to be noted that, in implementations of the disclosure, the "pre-set" can be implemented by pre-saving a corresponding code or table in a device (for example, including the terminal device and the network device) or in other manners that can be used for indicating related information, and the disclosure is not limited in this regard. For example, the "pre-set" may mean defined in a protocol. Optionally, the "protocol" may refer to a communication standard protocol, which may include, for example, an LTE protocol, an NR protocol, and a protocol applied to a future communication system, and the disclosure is not limited in this regard.

In some implementations of the disclosure, the method 200 further includes receiving configuration information, where the configuration information is used to configure the first slot offset and/or the second slot offset, and the second slot offset is an SRS resource-level slot offset configured for some or all SRS resources in the target SRS resource set.

Optionally, the configuration information is carried in RRC signaling.

In some implementations of the disclosure, the method 200 further includes obtaining update information, where the update information is used to update the first slot offset and/or the second slot offset, and the second slot offset is an SRS resource-level slot offset configured for some or all SRS resources in the target SRS resource set.

Optionally, the update information is carried in a MAC CE.

As such, the MAC CE is used for updating the first slot offset and/or the second slot offset, and the DCI indicates the third slot offset that is additionally configured, which can increase a probability of success in SRS transmission.

The following will elaborate the solutions of the disclosure with reference to implementations.

Implementation I.

In this implementation, the first slot offset is defined as the $K^{th}$ valid slot, and the maximum range is introduced for restriction, which can increase a probability of success in SRS transmission.

The terminal device receives SRS configuration information transmitted by the network device via RRC signaling, where the SRS configuration information is used to configure one or more SRS resource sets, and each SRS resource set includes one or more SRS resources. Optionally, the one or more SRS resource sets can be configured via RRC signaling SRS-ResourceSet, and the one or more SRS resources can be configured via RRC signaling SRS-Resource. Optionally, usage field in SRS-ResourceSet may be set to one of beamManagement, codebook, nonCodebook, or antennaSwitching.

The following will take target SRS resource set X configured with one first slot offset K as an example for illustration of the solutions of the disclosure. Optionally, the first slot offset K is defined as a $K^{th}$ available slot position, and the maximum range G is introduced for restriction. If the maximum range G is exceeded, the current SRS transmission will be canceled.

Optionally, the first slot offset is a slot valid for the target SRS resource set.

As an example, the valid slot refers to a slot that can be used for transmission of all SRS resources in an SRS resource set triggered by the current triggering signaling, that is, only a slot in which complete transmission of the SRS resource set at one time by the terminal device can be ensured can be regarded as the valid slot. As such, it is possible to ensure that the current triggering signaling can trigger complete SRS transmission, such that the triggering signaling can maximally have an opportunity for SRS transmission.

As another example, the valid slot refers to a slot that can be used for transmission of at least one SRS resource in an SRS resource set triggered by the current triggering signaling, that is, only a slot in which transmission of one or more SRS resources can be ensured can be regarded as the valid slot. As such, SRS transmission can be performed as early as possible, which is conducive to prompt SRS transmission and improves system performance. For example, the valid slot refers to a slot in which symbol locations corresponding to all SRS resources in the SRS resource set can be used for UL transmission, or the valid slot is to a slot in which a symbol location corresponding to at least one SRS resource in the SRS resource set can be used for UL transmission.

Figure 5:
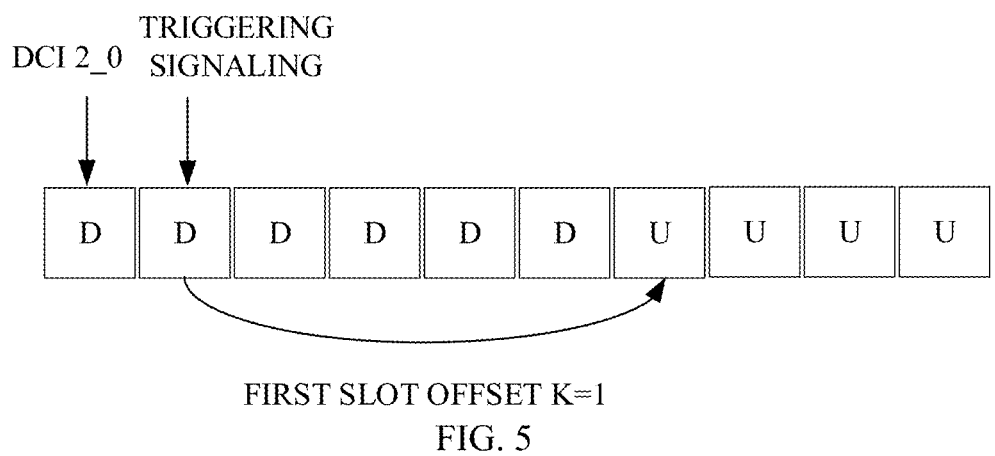
FIG. 5 to FIG. 10 are schematic timing diagrams illustrating SRS transmission based on a first slot offset provided in implementations of the disclosure.

FIG. 5 is a schematic timing diagram illustrating SRS transmission when K=1 provided in implementations of the disclosure.

As illustrated in FIG. 5, suppose that K=1, that is, a transmission position for the SRS resource set is the $1^{st}$ available slot position.

By defining a slot offset for a resource set as the $K^{th}$ available slot, it is possible to ensure success in SRS transmission. In addition, with aid of the maximum range, it is possible to reduce implementation complexity of the network device and the terminal device. In some cases, transmission corresponding to the current triggering signaling can be terminated promptly, which is conducive to transmission of new triggering signaling. Furthermore, the SRS resource set is taken as a whole for determining the valid slot, which is possible to ensure that SRS resources in the SRS resource set can be transmitted simultaneously. Moreover, if multiple SRS resource sets are triggered by the triggering signaling, different SRS resource sets can be configured with K of different values, and as such, transmission collision between multiple SRS resource sets can be avoided.

It is to be noted that, for details of the first slot offset, reference can be made to the foregoing elaborations, which will not be described in detail again herein to avoid redundancy.

The following will take target SRS resource Y configured with one second slot offset M as an example for illustration of the solutions of the disclosure. Optionally, the second slot offset M is defined as the $M^{th}$ available slot position, and the maximum range G is introduced for restriction. If the maximum range G is exceeded, the current SRS transmission will be canceled.

By defining a slot offset for a resource as the $M^{th}$ available slot, it is possible to ensure success in SRS transmission. In addition, with aid of the maximum range, it is possible to reduce implementation complexity of the network device and the terminal device. In some cases, transmission corresponding to the current triggering signaling can be terminated promptly, which is conducive to transmission of new triggering signaling. Furthermore, the valid slot is determined based on an SRS resource, which is possible to ensure that some SRS resources in an SRS resource set can be transmitted as early as possible, which can avoid delayed transmission of all SRS resources in the target SRS resource set.

Optionally, the second slot offset is a slot valid for the target SRS resource.

As an example, the valid slot refers to a slot that can be used for transmission of an SRS resource triggered by the current triggering signaling, that is, only a slot in which complete transmission of the SRS resource at one time by the terminal device can be ensured can be regarded as the valid slot. As such, it is possible to ensure that the current triggering signaling can trigger SRS transmission and the SRS transmission can be completed, such that the triggering signaling can maximally have an opportunity for SRS transmission.

As another example, the valid slot refers to a slot that can be used for transmission of at least one symbol in an SRS resource triggered by the current triggering signaling, that is, only a slot in which transmission of at least one symbol in the SRS resource can be ensured can be regarded as the valid slot. As such, SRS transmission can be performed as early as possible, which is conducive to prompt SRS transmission and improves system performance. For example, the valid slot refers to a slot in which a symbol location corresponding to the SRS resource can be used for UL transmission.

It is to be noted that, for details of the second slot offset, reference can be made to the foregoing elaborations, which will not be described in detail again herein to avoid redundancy.

It is to be further noted that, the implementation of the maximum range G is not limited in implementations of the disclosure.

For example, a value range or value of G may be pre-set.

Optionally, in implementations of the disclosure, the "pre-set" can be implemented by pre-saving a corresponding code or table in a device (for example, including the terminal device and the network device) or in other manners that can be used for indicating related information, and the disclosure is not limited in this regard. For example, the "pre-set" may mean defined in a protocol. Optionally, the "protocol" may refer to a communication standard protocol, which may include, for example, an LTE protocol, an NR protocol, and a protocol applied to a future communication system, and the disclosure is not limited in this regard.

For another example, the value range or value of G may be configured. For instance, the value range or value of G may be determined according to a parameter configured by the network device. For another instance, the value range or value of G may be indicated by RRC, a MAC CE, or physical-layer signaling (such as the DCI).

For another example, the G slots after slot n in which the triggering signaling is located may include the $G^{th}$ slot, or may not include the $G^{th}$ slot, where slot n is a slot in which a UE (i.e. terminal device) receives triggering signaling for an aperiodic SRS. Optionally, the G slots are G UL slots.
Implementation II.

In this implementation, the third slot offset additionally configured is indicated by indication information, which can increase a probability of success in SRS transmission.

The terminal device receives SRS configuration information transmitted by the network device via RRC signaling, where the SRS configuration information is used to configure one or more SRS resource sets, and each SRS resource set includes one or more SRS resources. Optionally, the one or more SRS resource sets can be configured via RRC signaling SRS-ResourceSet, and the one or more SRS resources can be configured via RRC signaling SRS-Resource. Optionally, usage field in SRS-ResourceSet may be set to one of beamManagement, codebook, nonCodebook, or antennaSwitching.

Optionally, target SRS resource set X is configured with one first slot offset K.

Optionally, the network device may indicate, via the DCI, the third slot offset N additionally configured for the target SRS resource set X.

The following will take the target SRS resource set among the one or more SRS resource sets as an example, to describe the solutions of the disclosure in connection with the first slot offset and the third slot offset.

Optionally, N is defined as the N slot. By indicating through DCI the third slot offset N additionally configured, it is possible to realize high timeliness and flexibility. In addition, the SRS resource set is taken as a whole, which is possible to ensure that SRS resources in the SRS resource set can be transmitted simultaneously.

Figure 6:
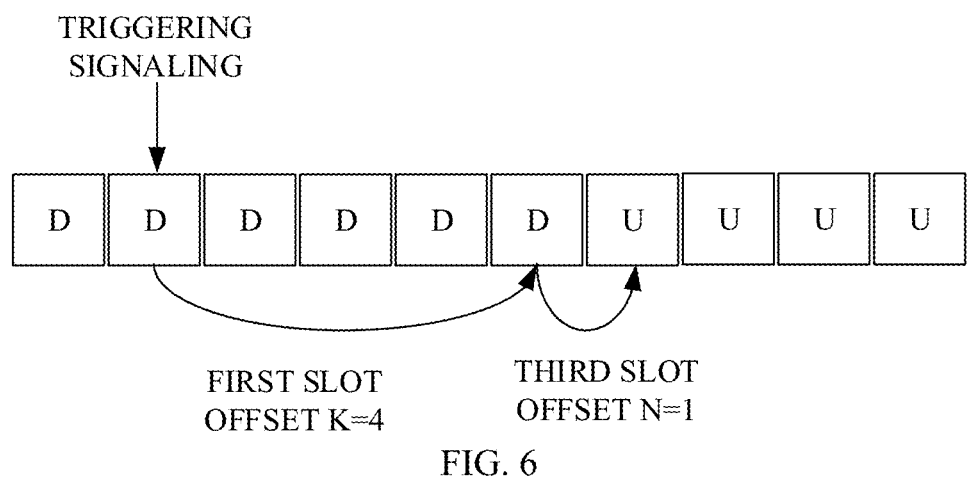

FIG. 6 is a schematic timing diagram illustrating SRS transmission based on the third slot offset N provided in implementations of the disclosure.

As illustrated in FIG. 6, the first slot offset K is four slots, and the third slot offset N is one slot. If the terminal device receives the triggering signaling in the $2^{nd}$ slot, the terminal device performs SRS transmission in the $7^{th}$ slot.

Optionally, N is defined as the N valid slot, and the maximum range G is introduced for restriction. If the maximum range G is exceeded, the current SRS transmission will be canceled. By indicating the third slot offset N through DCI, it is possible to realize high timeliness and flexibility. In addition, by re-defining the third slot offset N, it is possible to improve flexibility in SRS triggering. Furthermore, by taking the SRS resource set as a whole, it is possible to ensure that SRS resources in the SRS resource set can be transmitted simultaneously.

Figure 7:
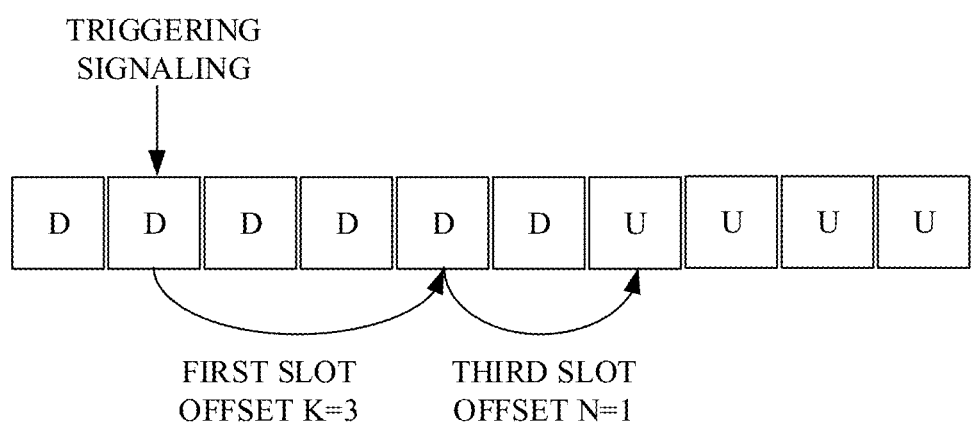

FIG. 7 is a schematic timing diagram illustrating SRS transmission based on the third slot offset N provided in implementations of the disclosure.

As illustrated in FIG. 7, the first slot offset K is three slots, and the third slot offset N is one valid slot. If the terminal device receives the triggering signaling in the $2^{nd}$ slot, the terminal device performs SRS transmission in the $7^{th}$ slot.

It is to be noted that, "K is defined as the $K^{th}$ slot" in FIG. 6 and FIG. 7 is merely an example of the disclosure. In other implementations, K may also be defined as the $K^{th}$ valid slot.

In this implementation, target SRS resource set X is configured with one first slot offset K, and at least one SRS resource in target SRS resource set X is configured with one second slot offset M, where the at least one SRS resource is at least one SRS resource in target SRS resource set X. For a resource not configured with a resource-level slot offset, the same slot offset as that for the SRS resource set (that is, the first slot offset K) will be used. The slot offset is determined based on an SRS resource, which is possible to ensure that some SRS resources in an SRS resource set can be transmitted as early as possible, which can avoid delayed transmission of all SRS resources in the whole SRS resource set.

The following will describe the solutions of the disclosure in connection with the second slot offset and the third slot offset.

Optionally, the network device may indicate, via the DCI, the third slot offset N additionally configured for target SRS resource Y that is configured with the second slot offset M. By determining a slot offset based on an SRS resource, it is possible to ensure that some SRS resources in an SRS resource set can be transmitted as early as possible, which can avoid delayed transmission of all SRS resources in the whole SRS resource set. By configuring for some SRS resources an additional slot offset indicated by the DCI, configuration can be more flexible, which is conducive to being used in more SRS resource sets.

As an example, N is defined as the $N^{th}$ slot.

Figure 8:
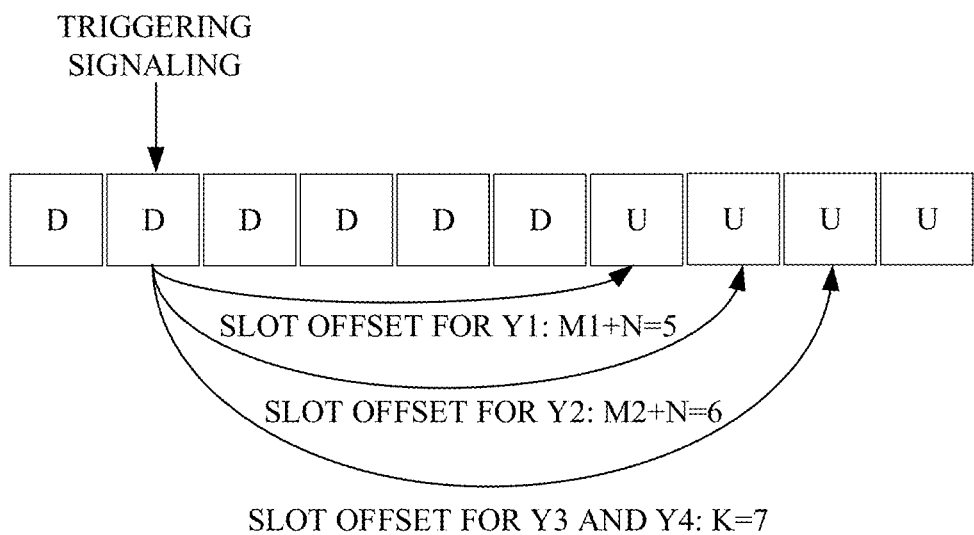

FIG. 8 is a schematic timing diagram illustrating SRS transmission based on the third slot offset N provided in implementations of the disclosure.

As illustrated in FIG. 8, the first slot offset K is 7; the second slot offset for SRS resource Y1 is M1, where M1=4; the second slot offset for SRS resource Y2 is M2, where M2=5; the third slot offset is one slot; and SRS resource Y3 and SRS resource Y4 are not configured with the second slot offset. In this case, if the terminal device receives the triggering signaling in the $2^{nd}$ slot, the terminal device transmits SRS resource Y1 in the $7^{th}$ slot, transmits SRS resource Y2 in the $8^{th}$ slot, and transmits SRS resource Y3 and SRS resource Y4 in the $9^{th}$ slot.

It is to be noted that, "N is defined as the N slot" in FIG. 8 is merely an example of the disclosure. In other implementations, N is defined as the N slot, and the maximum range G is introduced for restriction. If the maximum range G is exceeded, the current SRS transmission will be canceled.

Optionally, the network device may indicate, via the DCI, the third slot offset N additionally configured for target SRS resource Y that is not configured with the second slot offset M. By determining a slot offset based on an SRS resource, it is possible to ensure that some SRS resources in an SRS resource set can be transmitted as early as possible, which can avoid delayed transmission of all SRS resources in the whole SRS resource set. By configuring for some SRS resources an additional slot offset indicated the DCI, configuration can be more flexible, which is conducive to being used in more SRS resource sets.

As an example, N is defined as the $N^{th}$ slot.

Figure 9:
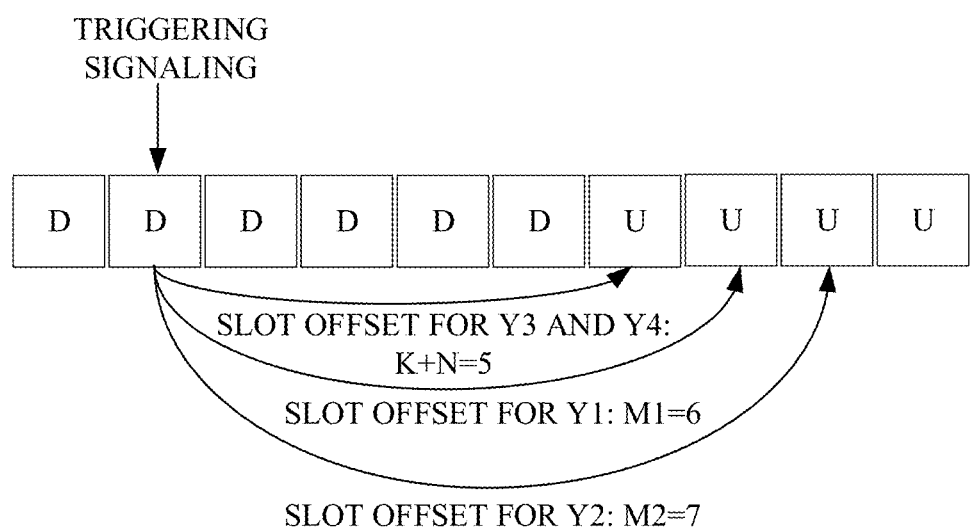

FIG. 9 is a schematic timing diagram illustrating SRS transmission based on the third slot offset N provided in implementations of the disclosure.

As illustrated in FIG. 9, the first slot offset is K is 4; the second slot offset for SRS resource Y1 is M1, where M1=6; the second slot offset for SRS resource Y2 is M2, where M2=7; the third slot offset is one slot; and SRS resource Y3 and SRS resource Y4 are not configured with the second slot offset. In this case, if the terminal device receives the triggering signaling in the $2^{nd}$ slot, the terminal device transmits SRS resource Y3 and SRS resource Y4 in the $7^{th}$ slot, transmits SRS resource Y1 in the $8^{th}$ slot, and transmits SRS resource Y2 in the $9^{th}$ slot.

It is to be noted that, "N is defined as the $N^{th}$ slot" in FIG. 9 is merely an example of the disclosure. In other implementations, N is defined as the N slot, and the maximum range G is introduced for restriction. If the maximum range G is exceeded, the current SRS transmission will be canceled.

Optionally, the network device may indicate, via the DCI, the third slot offset N additionally configured for all SRS resources in target SRS resource X. By determining a slot offset based on an SRS resource, it is possible to ensure that some SRS resources in an SRS resource set can be transmitted as early as possible, which can avoid delayed transmission of all SRS resources in the whole SRS resource set. By configuring for SRS resources an additional slot offset indicated by the DCI, it is possible to realize high timeliness and flexibility.

As an example, N is defined as the $N^{th}$ slot.

Figure 10:
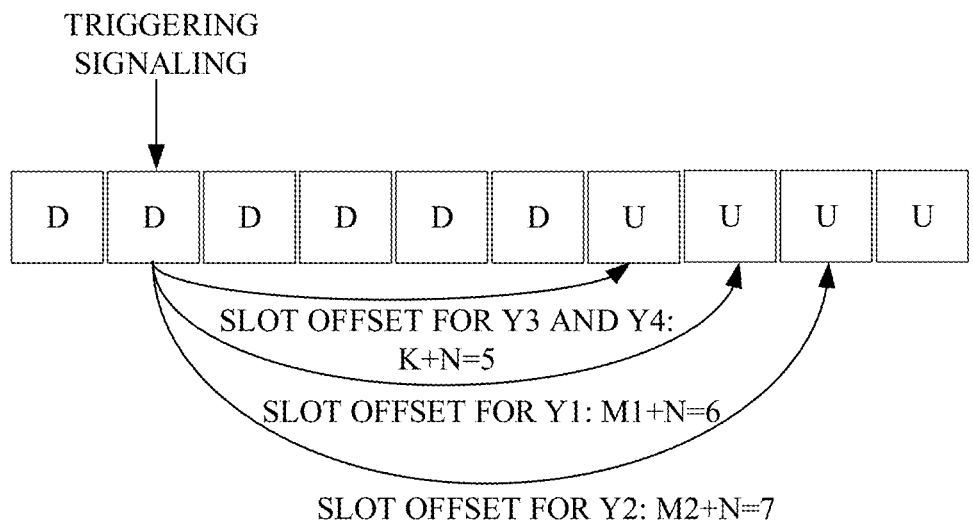

FIG. 10 is a schematic timing diagram illustrating SRS transmission based on the third slot offset N provided in implementations of the disclosure.

As illustrated in FIG. 10, the first slot offset K is 4; the second slot offset for SRS resource Y1 is M1, where M1=5; the second slot offset for SRS resource Y2 is M2, where M2=6; the third slot offset is one slot; and SRS resource Y3 and SRS resource Y4 are not configured with the second slot offset. In this case, if the terminal device receives the triggering signaling in the $2^{nd}$ slot, the terminal device transmits SRS resource Y3 and SRS resource Y4 in the $7^{th}$ slot, transmits SRS resource Y1 in an $8^{th}$ slot, and transmits SRS resource Y2 in the $9^{th}$ slot.

It is to be noted that, "N is defined as the N slot" in FIG. 10 is merely an example of the disclosure. In other implementations, N is defined as the N slot, and the maximum range G is introduced for restriction. If the maximum range G is exceeded, the current SRS transmission will be canceled.

In addition, for the formats and implementations of the first slot offset, the second slot offset, and the third slot offset in this implementation, reference can be made to the related elaborations above, which will not be described in detail again herein to avoid redundancy.

Implementation III:

In this implementation, the MAC CE is used for updating a slot offset, and the DCI indicates an additional slot offset, which can increase a probability of success in SRS transmission.

The terminal device receives SRS configuration information transmitted by the network device via RRC signaling, where the SRS configuration information is used to configure one or more SRS resource sets, and each SRS resource set includes one or more SRS resources. Optionally, the one or more SRS resource sets can be configured via RRC signaling SRS-ResourceSet, and the one or more SRS resources can be configured via RRC signaling SRS-Resource. Optionally, usage field in SRS-ResourceSet may be set to one of beamManagement, codebook, nonCodebook, or antennaSwitching.

The following will take the target SRS resource set among the one or more SRS resource sets as an example for illustration of the solutions of the disclosure.

Optionally, target SRS resource set X is configured with one first slot offset K.

Optionally, the network device can update or modify the first slot offset K for SRS resource set X through as follows.

Optionally, the first slot offset K for target SRS resource set X may be updated via MAC CE signaling.

Optionally, the first slot offset K for target SRS resource set X may be updated via MAC CE signaling, where K is defined as a $K^{th}$ available slot. In addition, the maximum range G is introduced for restriction. If the maximum range G is exceeded, the current SRS transmission will be canceled. The design of the valid slot and the maximum range G is consistent with that in implementation I, and will not be described in detail again herein to avoid redundancy. By updating a slot offset via MAC CE signaling, the slot offset can be adjusted in a wide range, which is beneficial to flexible scheduling of the network-device side and reduces implementation complexity of the network-device side.

Optionally, the first slot offset K for target SRS resource set X may be updated via MAC CE signaling, and the DCI indicates the third slot offset N additionally configured, and as such, a slot position for target SRS resource set X can be determined as K+N. The manner of indication by the DCI is consistent with that in implementation II, and will not be described in detail again herein to avoid redundancy. By updating a slot offset via MAC CE signaling, the slot offset can be adjusted in a wide range, and through indication by the DCI, the slot offset can be adjusted in a narrow range. As such, it is possible to ensure timeliness and flexibility while reducing implementation complexity.

Optionally, the first slot offset K for target SRS resource set X may be updated via MAC CE signaling, and the DCI indicates the third slot offset N additionally configured, and as such, a slot position for target SRS resource set X can be determined as K+N, where N is defined as the $N^{th}$ available slot. In addition, the maximum range G is introduced for restriction. If the maximum range G is exceeded, the current SRS transmission will be canceled. The design of the valid slot and the maximum range G is consistent with that in implementation I, and will not be described in detail again herein to avoid redundancy. The manner of indication by the DCI is consistent with that in implementation II, and will not be described in detail again herein to avoid redundancy. By updating a slot offset via MAC CE signaling, the slot offset can be adjusted in a wide range, and through indication by the DCI, the slot offset can be adjusted in a narrow range. As such, it is possible to ensure timeliness and flexibility while reducing implementation complexity.

Optionally, one second slot offset M is configured for at least one SRS resource. For a resource not configured with a resource-level slot offset, the same slot offset as that for the SRS resource set will be used. The slot offset is determined based on an SRS resource, which is possible to ensure that some SRS resources in an SRS resource set can be transmitted as early as possible, which can avoid delayed transmission of all SRS resources in the whole SRS resource set.

Optionally, the network device can update or modify the second slot offset M as follows.

Optionally, the second slot offset M for the at least one SRS resource may be updated via MAC CE signaling.

Optionally, the second slot offset M for the at least one SRS resource may be updated via MAC CE signaling, where M is defined as the $M^{th}$ available slot. In addition, the maximum range G is introduced for restriction. If the maximum range G is exceeded, the current SRS transmission will be canceled. The design of the valid slot and the maximum range G is consistent with that in implementation I, and will not be described in detail again herein to avoid redundancy.

Optionally, the second slot offset M for the at least one SRS resource may be updated via MAC CE signaling, and the DCI indicates the third slot offset N additionally configured, and as such, a slot position for the at least one SRS resource can be determined as M+N. The manner of indication by the DCI is consistent with that of slot indication for a resource in implementation II, and will not be described in detail again herein to avoid redundancy.

Optionally, the second slot offset M for the at least one SRS resource may be updated via MAC CE signaling, and the DCI indicates the third slot offset N additionally configured, and as such, a slot position for the at least one SRS resource can be determined as M+N, where N is defined as a $N^{th}$ available slot. In addition, the maximum range G is introduced for restriction. If the maximum range G is exceeded, the current SRS transmission will be canceled. The design of the valid slot and the maximum range G is consistent with that in implementation I, and will not be described in detail again herein to avoid redundancy. The manner of indication by the DCI is consistent with that of slot indication for a resource in implementation II, and will not be described in detail again herein to avoid redundancy.

Figure 11:
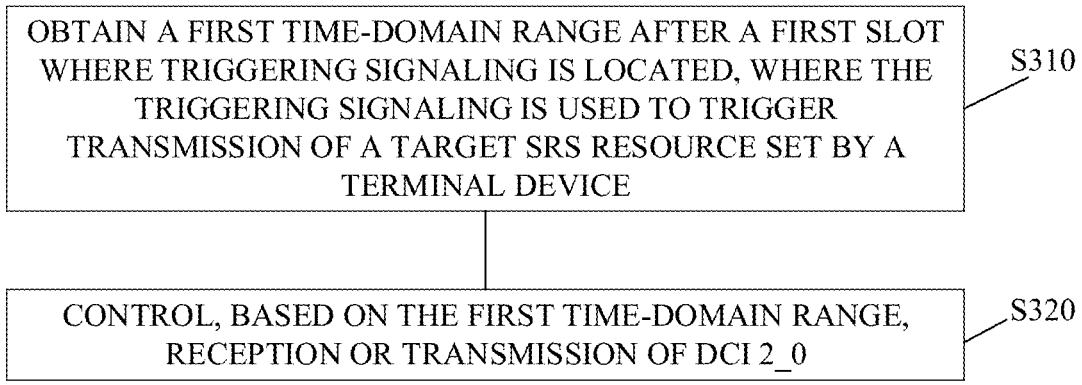
FIG. 11 is another schematic flowchart of a wireless communication method provided in implementations of the disclosure.

With the above technical solutions, the first slot offset is defined as can be used to determine a slot position used for transmitting the target SRS resource in the SRS resource set, in other words, the first slot offset may not be used to determine the slot position used for transmitting the target SRS resource in the SRS resource set. As such, a slot offset between the triggering signaling and SRS transmission will not be fixed, that is, a relative position between a slot for reception of the triggering signaling and a slot for SRS transmission can be selected or determined, which is possible to reduce restrictions and improve system flexibility FIG. 11 is a schematic flowchart of a wireless communication method 300 according to implementations of the disclosure. The method 300 may be implemented interactively by a terminal device and a network device. A terminal device illustrated in FIG. 11 may be the terminal device illustrated in FIG. 1, and a network device illustrated in FIG. 11 may be the access-network device illustrated in FIG. 1.

As illustrated in FIG. 11, the method 300 may include the following.

S310, obtain a first time-domain range after a first slot where triggering signaling is located, where the triggering signaling is used to trigger transmission of a target SRS resource set by a terminal device.

S320, control, based on the first time-domain range, reception or transmission of DCI 2_0.

For example, the terminal device controls reception of DCI 2_0 based on the first time-domain range.

For another example, a network device controls transmission of DCI 2_0 based on the first time-domain range.

In some implementations of the disclosure, reception of DCI 2_0 is not allowed within the first time-domain range. Or reception of DCI 2_0 is allowed within the first time-domain range, and a slot used for transmission of a target SRS resource in the target SRS resource set is a second slot, where a slot structure of the second slot remains unchanged.

In other words, transmission of DCI 2_0 is not allowed within the first time-domain range. Or transmission of DCI 2_0 is allowed within the first time-domain range, and a slot used for reception of the target SRS resource in the target SRS resource set is the second slot, where the slot structure of the second slot remains unchanged.

In some implementations of the disclosure, a slot used for transmission of a target SRS resource in the target SRS resource set is a second slot, and the first time-domain range includes slots between the first slot and the second slot.

In some implementations of the disclosure, the first time-domain range includes the first slot and the second slot.

In some implementations of the disclosure, the first time-domain range includes P slots after the first slot, or the first time-domain range is a time-domain range with a duration of Q.

In some implementations of the disclosure, P is predefined or configured by a higher-layer parameter.

In some implementations of the disclosure, Q is predefined or configured by a higher-layer parameter.

In some implementations of the disclosure, the method 300 includes transmitting, based on DCI 2_0, some SRS symbols in the target SRS resource on an UL symbol that is not modified into a DL symbol.

For example, the terminal device transmits, based on DCI 2_0, some SRS symbols in the target SRS resource on an UL symbol that is not modified into a DL symbol. In other words, the network device receives, based on DCI 2_0, some SRS symbols in the target SRS resource on an UL symbol that is not modified into a DL symbol.

The following will elaborate the solutions of the disclosure with reference to implementations.

Implementation IV:

By restricting an SFI, a probability of success in SRS transmission can be increased.

The terminal device receives SRS configuration information transmitted by the network device via RRC signaling, where the SRS configuration information is used to configure one or more SRS resource sets, and each SRS resource set includes one or more SRS resources. Optionally, the one or more SRS resource sets can be configured via RRC signaling SRS-ResourceSet, and the one or more SRS resources can be configured via RRC signaling SRS-Resource. Optionally, usage field in SRS-ResourceSet may be set to one of beamManagement, codebook, nonCodebook, or antennaSwitching.

The following will take the target SRS resource set among the one or more SRS resource sets as an example for illustration of the solutions of the disclosure.

Optionally, target SRS resource set X is configured with one first slot offset K.

Optionally, the network device can restrict an SFI-index field in DCI 2_0 as follows to avoid failure in SRS transmission.

Optionally, the network device can restrict a time range from slot n for SRS triggering by the triggering signaling to slot n' for SRS transmission by the terminal device. As such, it is possible to ensure completeness from SRS triggering to SRS transmission, thereby avoiding failure in SRS transmission caused by change in slot structure.

Optionally, transmission of DCI 2_0 is not allowed within the time range.

Optionally, transmission of DCI 2_0 is allowed within the time range, but it is required to ensure that a slot structure of a slot position for SRS transmission remains unchanged.

Optionally, the network device may forbid transmission of DCI 2_0 within P slots or P milliseconds (ms) after slot n for SRS triggering by the triggering signaling. As such, it is possible to avoid failure in SRS transmission caused by change in slot structure. In other words, by configuring a maximum range for restriction, implementation complexity of the network device can be reduced. If a time from SRS triggering to SRS transmission is too long, such procedure can be terminated promptly, which is beneficial to implementations of subsequent functions.

It is to be further noted that, the implementation of the maximum range P is not limited in implementations of the disclosure.

For example, a value range or value of P may be pre-set.

Optionally, in implementations of the disclosure, the "pre-set" can be implemented by pre-saving a corresponding code or table in a device (for example, including the terminal device and the network device) or in other manners that can be used for indicating related information, and the disclosure is not limited in this regard. For example, the "pre-set" may mean defined in a protocol. Optionally, the "protocol" may refer to a communication standard protocol, which may include, for example, an LTE protocol, an NR protocol, and a protocol applied to a future communication system, and the disclosure is not limited in this regard.

For another example, a value range or value of P may be configured. For instance, the value range or value of P may be determined according to a parameter configured by the network device. For another instance, the value range or value of P may be indicated by RRC, a MAC CE, or a physical-layer signaling (such as DCI).

Optionally, if a position for SRS transmission is a DL symbol due to change in slot format by DCI 2_0, some of SRSs will be transmitted in a slot position that is not modified into a DL symbol. As such, it is possible to ensure transmission of some of the SRSs, which can avoid delayed transmission of all SRS resources in the whole SRS resource set.

According to the technical solutions of implementations of the disclosure, the network device can configure for the terminal device various schemes of flexible SRS triggering. For example, the first slot offset is defined as the $K^{th}$ valid slot, and the maximum range is introduced for restriction. Here, by defining the first slot offset as the $K^{th}$ valid slot, it is possible to ensure successful SRS transmission. In addition, by introducing the maximum range for restriction, implementation complexity of the network device and the terminal device can be reduced. In some cases, transmission corresponding to the current triggering signaling can be terminated promptly, which is conducive to transmission of new triggering signaling. For another example, the DCI is used to indicate the third slot offset additionally configured. Here, by indicating the third slot offset N through DCI, it is possible to realize high timeliness and flexibility. For another example, the MAC CE is used to update the first slot offset and/or the second slot offset, and the DCI is used to indicate an additional slot offset. Here, two schemes are combined. In this way, by updating a slot offset via MAC CE signaling, the slot offset can be adjusted in a wide range, and through indication by the DCI, the slot offset can be adjusted in a narrow range. As such, it is possible to ensure timeliness and flexibility while reducing implementation complexity. For another example, by restricting an SFI index, it is possible to restrict change in slot format by an SFI and ensure successful SRS transmission to some extent.

As can be seen, with solutions of the disclosure, the network device can trigger SRS transmission flexibly, control scheduling flexibly, and reduce implementation complexity.

Preferable implementations of the disclosure have been described in detail above with reference to the accompanying drawings. However, the disclosure is not limited to the details described in the foregoing implementations. Within the scope of the technical concept of the disclosure, various simple modifications can be made to the technical solutions of the disclosure, and these simple modifications all falls within the protection scope of the disclosure. For example, various technical features described in the foregoing implementations may be combined in any suitable manner without contradiction, and in order to avoid unnecessary redundancy, various possible combinations are not further described in the disclosure. For another example, various implementations of the disclosure may also be combined in any manner, and as long as the combinations do not depart from the idea of the disclosure, they should also be considered as contents disclosed in the disclosure.

It should also be understood that, in various method implementations of the disclosure, the magnitude of a sequence number of each of the foregoing processes does not mean an execution order, and an execution order of each process should be determined according to a function and an internal logic of the process, which shall not constitute any limitation to an implementation process of implementations of the disclosure. In addition, in implementations of the disclosure, the terms "DL" and "UL" indicate a transmission direction of a signal or data, where "DL" indicates that a transmission direction of a signal or data is a first direction from a station to a UE in a cell, and "UL" indicates that a transmission direction of a signal or data is a second direction from a UE in a cell to a station. For example, a "DL signal" indicates that a transmission direction of the signal is the first direction. Furthermore, in implementations of the disclosure, the term "and/or" herein only describes an association relationship between associated objects, which means that there can be three relationships. Specifically, A and/or B can mean A alone, both A and B exist, and B alone. Besides, the character "/" herein generally indicates that the associated objects are in an "or" relationship.

Method implementations of the disclosure have been described in detail above with reference to FIG. 1 to FIG. 11. The following will elaborate apparatus implementations of the disclosure with reference to FIG. 12 to FIG. 17.

Figure 12:
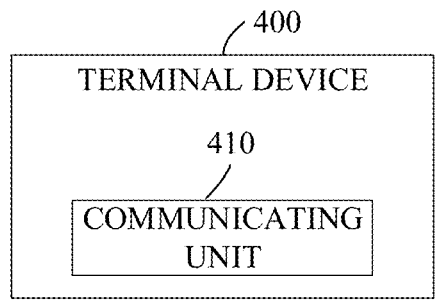
FIG. 12 and FIG. 13 are each a schematic block diagram of a terminal device provided in implementations of the disclosure.

FIG. 12 is a schematic block diagram of a terminal device 400 according to implementations of the disclosure.

As illustrated in FIG. 12, the terminal device 400 may include a communicating unit 410. The communicating unit 410 is configured to receive triggering signaling, where the triggering signaling is used to trigger transmission of a target SRS resource set by a terminal device, the target SRS resource set is configured with a first slot offset, and the first slot offset can be used to determine a slot position used for transmitting a target SRS resource in the SRS resource set.

In some implementations of the disclosure, the target SRS resource is not configured with a second slot offset, and the second slot offset is an SRS resource-level slot offset configured for some or all SRS resources in the target SRS resource set. The communicating unit 410 is further configured to transmit, based on the first slot offset, the target SRS resource in the target SRS resource set.

In some implementations of the disclosure, the target SRS resource is configured with a second slot offset, and the second slot offset is an SRS resource-level slot offset configured for some or all SRS resources in the target SRS resource set. The communicating unit 410 is further configured to transmit, based on the second slot offset, the target SRS resource in the target SRS resource set.

In some implementations of the disclosure, some or all SRS resources in the target SRS resource set are configured with the second slot offset of SRS resource level, where the second slot offset is M, M represents an $M^{th}$ valid slot or an $(M+1)^{th}$ valid slot or represents an $M^{th}$ slot or an $(M+1)^{th}$ slot, and M is an integer and M≥0.

In some implementations of the disclosure, the second slot offset is configured by RRC signaling, a MAC CE, or DCI.

In some implementations of the disclosure, the second slot offset is configured based on a value range T1~T2 of M, T1 represents a minimum value of M, T2 represents a maximum value of M, and T1 and T2 are pre-set.

In some implementations of the disclosure, a value range of M is 0~16 or 1~16.

In some implementations of the disclosure, the valid slot is a slot that can be used for transmission of the target SRS resource, and/or the valid slot is a slot that can be used for transmission of at least one symbol in the target SRS resource, and/or the valid slot is a slot in which a symbol location corresponding to the target SRS resource can be used for UL transmission, and/or the valid slot is a slot in which at least one symbol location among symbol locations corresponding to the target SRS resource can be used for UL transmission.

In some implementations of the disclosure, the communicating unit 410 is further configured to obtain first indication information, where the first indication information indicates a third slot offset that is additionally configured for the target SRS resource set or an SRS resource in the target SRS resource set.

In some implementations of the disclosure, the target SRS resource is not configured with a second slot offset, the second slot offset is an SRS resource-level slot offset configured for some or all SRS resources in the target SRS resource set, and the first indication information indicates the third slot offset that is additionally configured for an SRS resource not configured with the second slot offset in the target SRS resource set. The communicating unit 410 is further configured to transmit the target SRS resource based on the first slot offset and the third slot offset.

In some implementations of the disclosure, the target SRS resource is configured with a second slot offset, the second slot offset is an SRS resource-level slot offset configured for some or all SRS resources in the target SRS resource set, and the first indication information indicates the third slot offset that is additionally configured for an SRS resource configured with the second slot offset in the target SRS resource set. The communicating unit 410 is further configured to transmit the target SRS resource based on the second slot offset and the third slot offset.

In some implementations of the disclosure, the first indication information indicates the third slot offset that is additionally configured for all SRS resources in the target SRS resource set or additionally configured for the target SRS resource set.

In some implementations of the disclosure, the target SRS resource is not configured with the second slot offset, and the second slot offset is an SRS resource-level slot offset configured for some or all SRS resources in the target SRS resource set. The communicating unit 410 is further configured to transmit the target SRS resource based on the first slot offset and the third slot offset.

In some implementations of the disclosure, the target SRS resource is configured with the second slot offset, and the second slot offset is an SRS resource-level slot offset configured for some or all SRS resources in the target SRS resource set. The communicating unit 410 is further configured to transmit the target SRS resource based on the second slot offset and the third slot offset.

In some implementations of the disclosure, the first indication information is carried in DCI.

In some implementations of the disclosure, the first indication information indicates the third slot offset by at least one bit.

In some implementations of the disclosure, the amount of the at least one bit is pre-set or configured by a higher-layer parameter.

In some implementations of the disclosure, the third slot offset is N, N represents an $N^{th}$ slot or an $(N+1)^{th}$ slot or represents an $N^{th}$ valid slot or an $(N+1)^{th}$ valid slot, and N is an integer and N≥0.

In some implementations of the disclosure, a value range of N is 0~16 or 1~16.

In some implementations of the disclosure, the valid slot is a slot that can be used for transmission of the target SRS resource, and/or the valid slot is a slot that can be used for transmission of at least one symbol in the target SRS resource, and/or the valid slot is a slot in which a symbol location corresponding to the target SRS resource can be used for UL transmission, and/or the valid slot is a slot in which at least one symbol location among symbol locations corresponding to the target SRS resource can be used for UL transmission.

In some implementations of the disclosure, the valid slot is a slot that can be used for transmission of all SRS resources in the target SRS resource set, and/or the valid slot is a slot that can be used for transmission of one or more SRS resources in the target SRS resource set, and/or the valid slot is a slot that can be used for transmission of symbol locations corresponding to all SRS resources in the target SRS resource set, and/or the valid slot is a slot that can be used for transmission of a symbol location corresponding to one or more SRS resources in the target SRS resource set, and/or the valid slot is a slot in which symbol locations corresponding to all SRS resources in the target SRS resource set can be used for UL transmission, and/or the valid slot is a slot in which a symbol location corresponding to one or more SRS resources in the target SRS resource set can be used for UL transmission.

In some implementations of the disclosure, the first slot offset is K, K represents a $K^{th}$ valid slot or a $(K+1)^{th}$ valid slot or represents a $K^{th}$ slot or a $(K+1)^{th}$ slot, and K is an integer and K≥0.

In some implementations of the disclosure, the first slot offset is configured based on a value range T3~T4 of K, T3 represents a minimum value of K, T4 represents a maximum value of K, and T3 and T4 are pre-set.

In some implementations of the disclosure, a value range of K is 0~16 or 1~16.

In some implementations of the disclosure, the valid slot is a slot that can be used for transmission of all SRS resources in the target SRS resource set, and/or the valid slot is a slot that can be used for transmission of one or more SRS resources in the target SRS resource set, and/or the valid slot is a slot that can be used for transmission of symbol locations corresponding to all SRS resources in the target SRS resource set, and/or the valid slot is a slot that can be used for transmission of a symbol location corresponding to one or more SRS resources in the target SRS resource set, and/or the valid slot is a slot in which symbol locations corresponding to all SRS resources in the target SRS resource set can be used for UL transmission, and/or the valid slot is a slot in which a symbol location corresponding to one or more SRS resources in the target SRS resource set can be used for UL transmission.

In some implementations of the disclosure, the first slot offset is K, and K is an integer and K≥0; or some or all SRS resources in the target SRS resource set are configured with the second slot offset of SRS resource level, the second slot offset is M, and M is an integer and M≥0; or the target SRS resource set or an SRS resource in the target SRS resource set is additionally configured with the third slot offset, the third slot offset is N, and N is an integer and N≥0. A slot used for transmission of the target SRS resource is a second slot; and when K represents a $K^{th}$ valid slot or a $(K+1)^{th}$ valid slot, M represents an $M^{th}$ valid slot or an $(M+1)^{th}$ valid slot, or N represents an $N^{th}$ slot or an $(N+1)^{th}$ slot, the second slot belongs to G slots after a first slot in which the triggering signaling is located, where G is an integer and G≥0.

In some implementations of the disclosure, the G slots are G UL slots.

In some implementations of the disclosure, G is predefined or configured by a higher-layer parameter.

In some implementations of the disclosure, the communicating unit 410 is further configured to receive configuration information, where the configuration information is used to configure the first slot offset and/or the second slot offset, and the second slot offset is an SRS resource-level slot offset configured for some or all SRS resources in the target SRS resource set.

In some implementations of the disclosure, the configuration information is carried in RRC signaling.

In some implementations of the disclosure, the communicating unit 410 is further configured to obtain update information, where the update information is used to update the first slot offset and/or the second slot offset, and the second slot offset is an SRS resource-level slot offset configured for some or all SRS resources in the target SRS resource set.

In some implementations of the disclosure, the update information is carried in a MAC CE.

It should be understood that, apparatus implementations and method implementations correspond to each other. For similar elaborations, reference can be made to the method implementations. Specifically, the terminal device 400 illustrated in FIG. 12 may correspond to a corresponding entity for implementing the method 200 in implementations of the disclosure, and the above and other operations and/or functions of various units of the terminal device 400 are respectively intended for implementing corresponding operations in the method illustrated in FIG. 4, which will not be repeated herein for the sake of simplicity.

Figure 13:
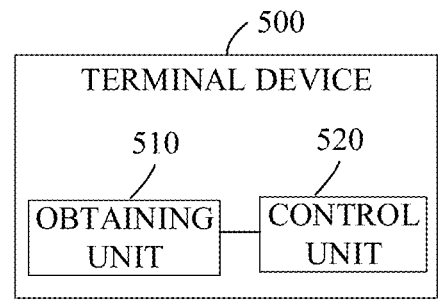

FIG. 13 is a schematic block diagram of a terminal device 500 in implementations of the disclosure.

As illustrated in FIG. 13, the terminal device 500 may include an obtaining unit 510 and a control unit 520. The obtaining unit 510 is configured to obtaining a first time-domain range after a first slot in which triggering signaling is located, where the triggering signaling is used to trigger transmission of a target SRS resource set by a terminal device. The control unit 520 is configured to control, based on the first time-domain range, reception of DCI 2_0.

In some implementations of the disclosure, reception of DCI 2_0 is not allowed within the first time-domain range. Or reception of DCI 2_0 is allowed within the first time-domain range, and a slot used for transmission of a target SRS resource in the target SRS resource set is a second slot, where a slot structure of the second slot remains unchanged.

In some implementations of the disclosure, a slot used for transmission of a target SRS resource in the target SRS resource set is a second slot, and the first time-domain range includes slots between the first slot and the second slot.

In some implementations of the disclosure, the first time-domain range includes the first slot and the second slot.

In some implementations of the disclosure, the first time-domain range includes P slots after the first slot, or the first time-domain range is a time-domain range with a duration of Q.

In some implementations of the disclosure, P is predefined or configured by a higher-layer parameter.

In some implementations of the disclosure, Q is predefined or configured by a higher-layer parameter.

In some implementations of the disclosure, the control unit 720 is further configured to transmit, based on DCI 2_0, some SRS symbols in the target SRS resource on a UL symbol that is not modified into a downlink (DL) symbol.

It should be understood that, apparatus implementations and method implementations correspond to each other. For similar elaborations, reference can be made to the method implementations. Specifically, the terminal device 500 illustrated in FIG. 13 may correspond to a corresponding entity for implementing the method 300 in implementations of the disclosure, and the above and other operations and/or functions of various units of the terminal device 500 are respectively intended for implementing corresponding operations in the method illustrated in FIG. 11, which will not be repeated herein for the sake of simplicity.

Figure 14:
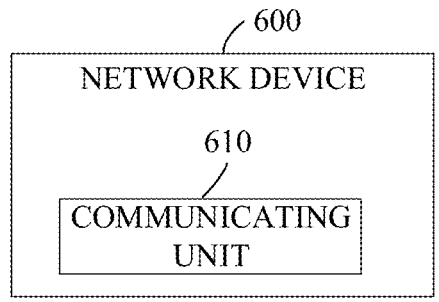
FIG. 14 and FIG. 15 are each a schematic block diagram of a network device provided in implementations of the disclosure.

FIG. 14 is a schematic block diagram of a network device 600 according to implementations of the disclosure.

As illustrated in FIG. 14, the network device 600 may include a communicating unit 610. The communicating unit 610 is configured to transmit triggering signaling, where the triggering signaling is used to trigger transmission of a target SRS resource set by a terminal device, the target SRS resource set is configured with a first slot offset, and the first slot offset can be used to determine a slot position used for transmitting a target SRS resource in the SRS resource set.

In some implementations of the disclosure, the target SRS resource is not configured with a second slot offset, and the second slot offset is an SRS resource-level slot offset configured for some or all SRS resources in the target SRS resource set. The communicating unit 610 is further configured to receive, based on the first slot offset, the target SRS resource in the target SRS resource set.

In some implementations of the disclosure, the target SRS resource is configured with a second slot offset, and the second slot offset is an SRS resource-level slot offset configured for some or all SRS resources in the target SRS resource set. The communicating unit 610 is further configured to receive, based on the second slot offset, the target SRS resource in the target SRS resource set.

In some implementations of the disclosure, some or all SRS resources in the target SRS resource set are configured with the second slot offset of SRS resource level, where the second slot offset is M, M represents an $M^{th}$ valid slot or an $(M+1)^{th}$ valid slot or represents an $M^{th}$ slot or an $(M+1)^{th}$ slot, and M is an integer and M≥0.

In some implementations of the disclosure, the second slot offset is configured by RRC signaling, a MAC CE, or DCI.

In some implementations of the disclosure, the second slot offset is configured based on a value range T1~T2 of M, T1 represents a minimum value of M, T2 represents a maximum value of M, and T1 and T2 are pre-set.

In some implementations of the disclosure, a value range of M is 0~16 or 1~16.

In some implementations of the disclosure, the valid slot is a slot that can be used for transmission of the target SRS resource, and/or the valid slot is a slot that can be used for transmission of at least one symbol in the target SRS resource, and/or the valid slot is a slot in which a symbol location corresponding to the target SRS resource can be used for UL transmission, and/or the valid slot is a slot in which at least one symbol location among symbol locations corresponding to the target SRS resource can be used for UL transmission.

In some implementations of the disclosure, the communicating unit 610 is further configured to transmit first indication information, where the first indication information indicates a third slot offset that is additionally configured for the target SRS resource set or an SRS resource in the target SRS resource set.

In some implementations of the disclosure, the target SRS resource is not configured with a second slot offset, the second slot offset is an SRS resource-level slot offset configured for some or all SRS resources in the target SRS resource set, and the first indication information indicates the third slot offset that is additionally configured for an SRS resource not configured with the second slot offset in the target SRS resource set. The communicating unit 610 is further configured to receive the target SRS resource based on the first slot offset and the third slot offset.

In some implementations of the disclosure, the target SRS resource is configured with a second slot offset, the second slot offset is an SRS resource-level slot offset configured for some or all SRS resources in the target SRS resource set, and the first indication information indicates the third slot offset that is additionally configured for an SRS resource configured with the second slot offset in the target SRS resource set. The communicating unit 610 is further configured to receive the target SRS resource based on the second slot offset and the third slot offset.

In some implementations of the disclosure, the first indication information indicates the third slot offset that is additionally configured for all SRS resources in the target SRS resource set or additionally configured for the target SRS resource set.

In some implementations of the disclosure, the target SRS resource is not configured with the second slot offset, and the second slot offset is an SRS resource-level slot offset configured for some or all SRS resources in the target SRS resource set. The communicating unit 610 is further configured to receive the target SRS resource based on the first slot offset and the third slot offset.

In some implementations of the disclosure, the target SRS resource is configured with the second slot offset, and the second slot offset is an SRS resource-level slot offset configured for some or all SRS resources in the target SRS resource set. The communicating unit 610 is further configured to receive the target SRS resource based on the second slot offset and the third slot offset.

In some implementations of the disclosure, the first indication information is carried in DCI.

In some implementations of the disclosure, the first indication information indicates the third slot offset by at least one bit.

In some implementations of the disclosure, the amount of the at least one bit is pre-set or configured by a higher-layer parameter.

In some implementations of the disclosure, the third slot offset is N, N represents an $N^{th}$ slot or an $(N+1)^{th}$ slot or represents an N valid slot or an $(N+1)^{th}$ valid slot, and N is an integer and N≥0.

In some implementations of the disclosure, a value range of N is 0~16 or 1~16.

In some implementations of the disclosure, the valid slot is a slot that can be used for transmission of the target SRS resource, and/or the valid slot is a slot that can be used for transmission of at least one symbol in the target SRS resource, and/or the valid slot is a slot in which a symbol location corresponding to the target SRS resource can be used for UL transmission, and/or the valid slot is a slot in which at least one symbol location among symbol locations corresponding to the target SRS resource can be used for UL transmission.

In some implementations of the disclosure, the valid slot is a slot that can be used for transmission of all SRS resources in the target SRS resource set, and/or the valid slot is a slot that can be used for transmission of one or more SRS resources in the target SRS resource set, and/or the valid slot is a slot that can be used for transmission of symbol locations corresponding to all SRS resources in the target SRS resource set, and/or the valid slot is a slot that can be used for transmission of a symbol location corresponding to one or more SRS resources in the target SRS resource set, and/or the valid slot is a slot in which symbol locations corresponding to all SRS resources in the target SRS resource set can be used for UL transmission, and/or the valid slot is a slot in which a symbol location corresponding to one or more SRS resources in the target SRS resource set can be used for UL transmission.

In some implementations of the disclosure, the first slot offset is K, K represents a $K^{th}$ valid slot or a $(K+1)^{th}$ valid slot or represents a $K^{th}$ slot or a $(K+1)^{th}$ slot, and K is an integer and K≥0.

In some implementations of the disclosure, the first slot offset is configured based on a value range T3~T4 of K, T3 represents a minimum value of K, T4 represents a maximum value of K, and T3 and T4 are pre-set.

In some implementations of the disclosure, a value range of K is 0~16 or 1~16.

In some implementations of the disclosure, the valid slot is a slot that can be used for transmission of all SRS resources in the target SRS resource set, and/or the valid slot is a slot that can be used for transmission of one or more SRS resources in the target SRS resource set, and/or the valid slot is a slot that can be used for transmission of symbol locations corresponding to all SRS resources in the target SRS resource set, and/or the valid slot is a slot that can be used for transmission of a symbol location corresponding to one or more SRS resources in the target SRS resource set, and/or the valid slot is a slot in which symbol locations corresponding to all SRS resources in the target SRS resource set can be used for UL transmission, and/or the valid slot is a slot in which a symbol location corresponding to one or more SRS resources in the target SRS resource set can be used for UL transmission.

In some implementations of the disclosure, the first slot offset is K, and K is an integer and K≥0; or some or all SRS resources in the target SRS resource set are configured with the second slot offset of SRS resource level, the second slot offset is M, and M is an integer and M≥0; or the target SRS resource set or an SRS resource in the target SRS resource set is additionally configured with the third slot offset, the third slot offset is N, and N is an integer and N≥0. A slot used for reception of the target SRS resource is a second slot; and when K represents a $K^{th}$ valid slot or a $(K+1)^{th}$ valid slot, M represents an $M^{th}$ valid slot or an $(M+1)^{th}$ valid slot, or N represents an N slot or an $(N+1)^{th}$ slot, the second slot belongs to G slots after a first slot in which the triggering signaling is located, where G is an integer and G≥0.

In some implementations of the disclosure, the G slots are G UL slots.

In some implementations of the disclosure, G is pre-defined or configured by a higher-layer parameter.

In some implementations of the disclosure, the communicating unit 610 is further configured to transmit configuration information, where the configuration information is used to configure the first slot offset and/or the second slot offset, and the second slot offset is an SRS resource-level slot offset configured for some or all SRS resources in the target SRS resource set.

In some implementations of the disclosure, the configuration information is carried in RRC signaling.

In some implementations of the disclosure, the communicating unit 610 is further configured to transmit update information, where the update information is used to update the first slot offset and/or the second slot offset, and the second slot offset is an SRS resource-level slot offset configured for some or all SRS resources in the target SRS resource set.

In some implementations of the disclosure, the update information is carried in a MAC CE.

It should be understood that, apparatus implementations and method implementations correspond to each other. For similar elaborations, reference can be made to the method implementations. Specifically, the network device 600 illustrated in FIG. 14 may correspond to a corresponding entity for implementing the method 200 in implementations of the disclosure, and the above and other operations and/or functions of various units of the network device 600 are respectively intended for implementing corresponding operations in the method illustrated in FIG. 4, which will not be repeated herein for the sake of simplicity.

Figure 15:
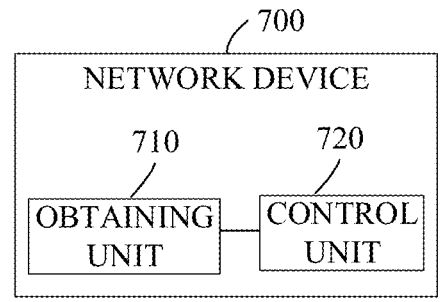

FIG. 15 is a schematic block diagram of a network device 400 according to implementations of the disclosure.

As illustrated in FIG. 15, the network device 400 may include an obtaining unit 710 and a control unit 720. The obtaining unit 710 is configured to obtain a first time-domain range after a first slot in which triggering signaling is located, where the triggering signaling is used to trigger transmission of a target SRS resource set by a terminal device. The control unit 720 is configured to control, based on the first time-domain range, transmission of DCI 2_0.

In some implementations of the disclosure, transmission of DCI 2_0 is not allowed within the first time-domain range. Or transmission of DCI 2_0 is allowed within the first time-domain range, and a slot used for reception of a target SRS resource in the target SRS resource set is a second slot, where a slot structure of the second slot remains unchanged.

In some implementations of the disclosure, a slot used for reception of a target SRS resource in the target SRS resource set is a second slot, and the first time-domain range includes slots between the first slot and the second slot.

In some implementations of the disclosure, the first time-domain range includes the first slot and the second slot.

In some implementations of the disclosure, the first time-domain range includes P slots after the first slot, or the first time-domain range is a time-domain range with a duration of Q.

In some implementations of the disclosure, P is predefined or configured by a higher-layer parameter.

In some implementations of the disclosure, Q is predefined or configured by a higher-layer parameter.

In some implementations of the disclosure, the communicating unit 610 is further configured to receive, based on DCI 2_0, some SRS symbols in the target SRS resource on an UL symbol that is not modified into a DL symbol.

It should be understood that, apparatus implementations and method implementations correspond to each other. For similar elaborations, reference can be made to the method implementations. Specifically, the network device 700 illustrated in FIG. 15 may correspond to a corresponding entity for implementing the method 300 in implementations of the disclosure, and the above and other operations and/or functions of various units of the network device 700 are respectively intended for implementing corresponding operations in the method illustrated in FIG. 11, which will not be repeated herein for the sake of simplicity.

The communication device in implementations of the disclosure has been described above from the perspective of functional modules with reference to the accompanying drawings. It should be understood that, the functional module may be implemented by the form of hardware, or may be implemented by an instruction in the form of software, or may be implemented by a combination of hardware and software module.

Specifically, each step of the method implementations of the disclosure may be completed by an integrated logic circuit of hardware in a processor and/or an instruction in the form of software. The steps of the method disclosed in implementations of the disclosure may be directly implemented by a hardware decoding processor, or may be performed by hardware and software modules in the decoding processor.

Optionally, the software module can be located in a storage medium such as a random access memory (RAM), a flash memory, a read only memory (ROM), a programmable ROM (PROM), or an electrically erasable programmable memory, registers, and the like. The storage medium is located in a memory. The processor reads the information in the memory, and completes the steps of the foregoing method implementations with the hardware of the processor.

For example, the obtaining unit described above may be implemented by the processor, and the communicating unit described above may be implemented by a transceiver.

Figure 16:
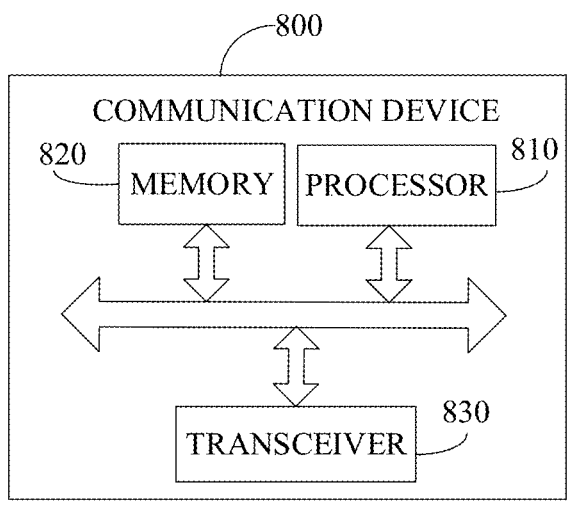
FIG. 16 is a schematic block diagram of a communication device provided in implementations of the disclosure.

FIG. 16 is a schematic structural diagram of a communication device 800 according to implementations of the disclosure.

As illustrated in FIG. 16, the communication device 800 may include a processor 810.

The processor 810 can invoke and execute computer programs stored in a memory, to perform the method in implementations of the disclosure.

Referring to FIG. 16 again, the communication device 800 may further include the memory 820.

The memory 820 can be configured to store indication information, or store codes, instructions, etc. executable by the processor 810. The processor 810 can invoke and execute the computer programs stored in the memory 820, to perform the method in implementations of the disclosure. The memory 820 may be a separate device independent of the processor 810, or may be integrated into the processor 810.

Referring to FIG. 16 again, the communication device 800 can further include a transceiver 830.

The processor 810 can control the transceiver 830 to communicate with other devices, specifically, to transmit information or data to other devices or to receive information or data transmitted by other devices. The transceiver 830 may include a transmitter and a receiver. The transceiver 830 may further include an antenna, where one or more antennas can be provided.

It should be understood that, various components in the communication device 800 are connected together via a bus system. In addition to a data bus, the bus system may further include a power bus, a control bus, and a status signal bus.

It should also be understood that, the communication device 800 may be operable as the terminal device in implementations of the disclosure, and the communication device 800 can implement the operations performed by the terminal device in various methods in implementations of the disclosure. In other words, the communication device 800 in implementations of the disclosure can correspond to the terminal device 400 or 500 in implementations of the disclosure, and can correspond to a corresponding entity for implementing the method 200 or 300 according to implementations of the disclosure, which will not be repeated herein for the sake of simplicity. Similarly, the communication device 800 may be operable as the network device in implementations of the disclosure, and the communication device 800 can implement the operations performed by the network device in various methods in implementations of the disclosure. In other words, the communication device 800 in implementations of the disclosure can correspond to the network device 600 or 700 in implementations of the disclosure, and can correspond to a corresponding entity for implementing the method 200 or 300 according to implementations of the disclosure, which will not be repeated herein for the sake of simplicity.

In addition, implementations of the disclosure further provide a chip.

For example, the chip may be an integrated circuit chip with signal processing capabilities, which can implement or execute various methods, steps, or logic blocks disclosed in implementations of the disclosure. The chip may also be referred to as a system-on-chip (SOC). Optionally, the chip is applicable to various communication devices, to cause a communication device equipped with the chip to perform various methods, steps, or logic blocks disclosed in implementations of the disclosure.

Figure 17:
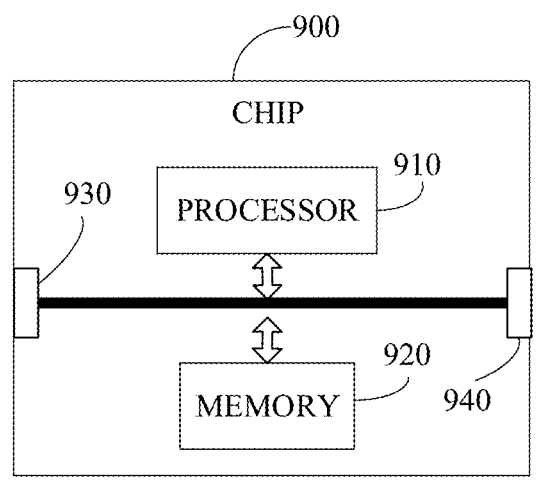
FIG. 17 is a schematic block diagram of a chip provided in implementations of the disclosure.

FIG. 17 is a schematic structural diagram of a chip 900 according to implementations of the disclosure.

As illustrated in FIG. 17, the chip 900 includes a processor 910.

The processor 910 can invoke and execute computer programs stored in a memory to perform the method in implementations of the disclosure.

Referring to FIG. 17 again, the chip 900 further includes the memory 920.

The processor 910 can invoke and execute the computer programs stored in the memory 920 to perform the method in implementations of the disclosure. The memory 920 can be configured to store indication information, or store codes, instructions, etc. executable by the processor 910. The memory 920 may be a separate device independent of the processor 910, or may be integrated into the processor 910.

Referring to FIG. 17 again, the chip 900 may further include an input interface 930.

The processor 910 can control the input interface 930 to communicate with other devices or chips, specifically, to obtain information or data transmitted by other devices or chips.

Referring to FIG. 17 again, the chip 900 may further include an output interface 940.

The processor 910 can control the output interface 940 to communicate with other devices or chips, specifically, to output information or data to other devices or chips.

It should be understood that, the chip is applicable to the network device in implementations of the disclosure. The chip can implement the operations performed by the network device in various methods in implementations of the disclosure, and can also implement the operations performed by the terminal device in various methods in implementations in the disclosure, which will not be repeated herein for the sake of simplicity.

It should be also understood that, various components in the chip 900 are connected together via a bus system. In addition to a data bus, the bus system may further include a power bus, a control bus, and a status signal bus.

The processor described above may include but is not limited to a general-purpose processor, a digital signal processor (DSP), an application specific integrated circuit (ASIC), a field programmable gate array (FPGA), or other programmable logic devices, discrete gates or transistor logic devices, discrete hardware components, etc.

The processor can be configured to perform or execute the methods, steps, and logic blocks disclosed in implementations of the disclosure can be implemented or executed. The steps of the method disclosed in implementations of the disclosure may be directly implemented by a hardware decoding processor, or may be performed by hardware and software modules in the decoding processor. The software module can be located in a storage medium such as a RAM, a flash memory, a ROM, a PROM, or an erasable programmable memory, registers, and the like. The storage medium is located in the memory. The processor reads the information in the memory, and completes the steps of the method described above with the hardware of the processor.

The memory described above may include but is not limited to a volatile memory and/or a non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM).

It should be noted that, the memory described in the disclosure is intended to include, but is not limited to, these and any other suitable types of memory.

Implementations of the disclosure further provide a computer-readable storage medium. The computer-readable storage medium is configured to store computer programs. The computer-readable storage medium stores one or more programs. The one or more programs include instructions which, when executed by a portable electronic device including multiple application programs, are operable with the portable electronic device to perform implementations in the method 200 or 300.

Optionally, the computer-readable storage medium is applicable to the network device of implementations of the disclosure. The computer programs are operable with a computer to implement the operations performed by the network device in various methods in implementations of the disclosure, which will not be repeated herein for the sake of simplicity.

Optionally, the computer-readable storage medium is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program product. The computer program product includes computer programs.

Optionally, the computer program product is applicable to the network device of implementations of the disclosure. The computer programs are operable with a computer to implement the operations performed by the network device in various methods in implementations of the disclosure, which will not be repeated herein for the sake of simplicity.

Optionally, the computer program product is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program. The computer program, when executed by a computer, is operable with the computer to perform implementations in the method 200 or 300.

Optionally, the computer program is applicable to the network device of implementations of the disclosure. The computer program, when executed by a computer, is operable with the computer to implement the operations performed by the network device in various methods in implementations of the disclosure, which will not be repeated herein for the sake of simplicity.

In addition, implementations of the disclosure further provide a communication system. The communication system may include the terminal device and the network device described above, to constitute the communication system 100 illustrated in FIG. 1, which will not be repeated herein for the sake of simplicity. It is to be noted that, the term "system" or the like in the disclosure may also be referred to as "network management architecture" or "network architecture", etc.

It should be also understood that, the terms used in implementations of the disclosure and the appended claims are merely intended for describing the implementations, rather than limiting implementations of the disclosure.

For example, the singular form "a/an", "said", "above", and "the" used in implementations of the disclosure and the appended claims are also intended to include multiple forms, unless specified otherwise in the context.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

It will be evident to those skilled in the art that, for the sake of convenience and simplicity, in terms of the specific working processes of the foregoing systems, apparatuses, and units, reference can be made to the corresponding processes in the foregoing method implementations, which will not be repeated herein.

It will be appreciated that the systems, apparatuses, and methods disclosed in implementations of the disclosure may also be implemented in various other manners.

For example, the division of units, modules, or assemblies in the foregoing apparatus implementations is only a division of logical functions, and there may be other manners of division available in practice, e.g., multiple units, modules, or assemblies may be combined or may be integrated into another system, or some features may be ignored or skipped. Separated units/modules/assemblies as illustrated may or may not be physically separated, that is, may reside at one location or may be distributed to multiple networked units. Some or all of the units/modules/assemblies may be selectively adopted according to practical needs to achieve desired objectives of the disclosure.

It is to be noted that, the coupling or direct coupling or communication connection as illustrated or discussed may be an indirect coupling or communication connection through some interface, device, or unit, and may be electrical, mechanical, or otherwise.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wireless communication method, comprising:
receiving triggering signaling, the triggering signaling being used to trigger transmission of a target sounding reference signal (SRS) resource set by a terminal device, the target SRS resource set being configured with a first slot offset, and the first slot offset can be used to determine a slot position used for transmitting a target SRS resource in the target SRS resource set;
obtaining first indication information, wherein the first indication information indicates a third slot offset that is additionally configured for the target SRS resource set or an SRS resource in the target SRS resource set; wherein the target SRS resource is not configured with a second slot offset, the second slot offset is an SRS resource-level slot offset configured for some or all SRS resources in the target SRS resource set, the first indication information indicates the third slot offset that is additionally configured for an SRS resource not configured with the second slot offset in the target SRS resource set; and
transmitting the target SRS resource based on the first slot offset and the third slot offset.

2. The method of claim 1, wherein the first indication information is carried in downlink control information (DCI).

3. The method of claim 1, wherein the third slot offset is N, N represents an $N^{th}$ slot or an $(N+1)^{th}$ slot or represents an $N^{th}$ valid slot or an $(N+1)^{th}$ valid slot, and N is an integer and N≥0.

4. The method of claim 3, wherein at least one of:
the valid slot is a slot that can be used for transmission of all SRS resources in the target SRS resource set;

the valid slot is a slot that can be used for transmission of one or more SRS resources in the target SRS resource set; the valid slot is a slot that can be used for transmission of symbol locations corresponding to all SRS resources in the target SRS resource set;

the valid slot is a slot that can be used for transmission of a symbol location corresponding to one or more SRS resources in the target SRS resource set;

the valid slot is a slot in which symbol locations corresponding to all SRS resources in the target SRS resource set can be used for UL transmission; and the valid slot is a slot in which a symbol location corresponding to one or more SRS resources in the target SRS resource set can be used for UL transmission.

5. A network device, comprising:
a transceiver;
a processor; and
a memory storing computer programs which, when executed by the processor, are operable with the processor to:
cause the transceiver to transmit triggering signaling, the triggering signaling being used to trigger transmission of a target sounding reference signal (SRS) resource set by a terminal device, the target SRS resource set being configured with a first slot offset, and the first slot offset can be used to determine a slot position used for transmitting a target SRS resource in the target SRS resource set;
cause the transceiver to transmit first indication information, wherein the first indication information indicates a third slot offset that is additionally configured for the target SRS resource set or an SRS resource in the target SRS resource set; wherein the target SRS resource is not configured with a second slot offset, the second slot offset is an SRS resource-level slot offset configured for some or all SRS resources in the target SRS resource set, the first indication information indicates the third slot offset that is additionally configured for an SRS resource not configured with the second slot offset in the target SRS resource set;
cause the transceiver to receive the target SRS resource based on the first slot offset and the third slot offset.

6. The network device of claim 5, wherein the first indication information is carried in downlink control information (DCI).

7. The network device of claim 5, wherein the third slot offset is N, N represents an $N^{th}$ slot or an $(N+1)^{th}$ slot or represents an $N^{th}$ valid slot or an $(N+1)^{th}$ valid slot, and N is an integer and N≥0.

8. The network device of claim 7, wherein at least one of:
the valid slot is a slot that can be used for transmission of all SRS resources in the target SRS resource set;
the valid slot is a slot that can be used for transmission of one or more SRS resources in the target SRS resource set;
the valid slot is a slot that can be used for transmission of symbol locations corresponding to all SRS resources in the target SRS resource set;
the valid slot is a slot that can be used for transmission of a symbol location corresponding to one or more SRS resources in the target SRS resource set;
the valid slot is a slot in which symbol locations corresponding to all SRS resources in the target SRS resource set can be used for UL transmission; and
the valid slot is a slot in which a symbol location corresponding to one or more SRS resources in the target SRS resource set can be used for UL transmission.

9. A terminal device, comprising:
a transceiver;
a processor; and
a memory storing computer programs which, when executed by the processor, are operable with the processor to:
cause the transceiver to receive triggering signaling, the triggering signaling being used to trigger transmission of a target sounding reference signal (SRS) resource set by a terminal device, the target SRS resource set being configured with a first slot offset, and the first slot offset can be used to determine a slot position used for transmitting a target SRS resource in the target SRS resource set;
cause the transceiver to obtain first indication information, wherein the first indication information indicates a third slot offset that is additionally configured for the target SRS resource set or an SRS resource in the target SRS resource set; wherein the target SRS resource is not configured with a second slot offset, the second slot offset is an SRS resource-level slot offset configured for some or all SRS resources in the target SRS resource set, the first indication information indicates the third slot offset that is additionally configured for an SRS resource not configured with the second slot offset in the target SRS resource set;
cause the transceiver to transmit the target SRS resource based on the first slot offset and the third slot offset.

10. The terminal device of claim 9, wherein the first indication information is carried in DCI.

11. The terminal device of claim 9, wherein the third slot offset is N, N represents an $N^{th}$ slot or an $(N+1)^{th}$ slot or represents an $N^{th}$ valid slot or an $(N+1)^{th}$ valid slot, and N is an integer and N≥0.

12. The terminal device of claim 11, wherein at least one of:
the valid slot is a slot that can be used for transmission of all SRS resources in the target SRS resource set;
the valid slot is a slot that can be used for transmission of one or more SRS resources in the target SRS resource set;
the valid slot is a slot that can be used for transmission of symbol locations corresponding to all SRS resources in the target SRS resource set;
the valid slot is a slot that can be used for transmission of a symbol location corresponding to one or more SRS resources in the target SRS resource set;
the valid slot is a slot in which symbol locations corresponding to all SRS resources in the target SRS resource set can be used for UL transmission; and
the valid slot is a slot in which a symbol location corresponding to one or more SRS resources in the target SRS resource set can be used for UL transmission.

* * * * *